US011785162B2

(12) United States Patent
Nakano

(10) Patent No.: US 11,785,162 B2
(45) Date of Patent: Oct. 10, 2023

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Kyosuke Nakano, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/482,539

(22) Filed: Sep. 23, 2021

(65) Prior Publication Data

US 2022/0131996 A1    Apr. 28, 2022

(30) Foreign Application Priority Data

Oct. 28, 2020 (JP) ................................. 2020-180838

(51) Int. Cl.
    *G06F 3/12*     (2006.01)
    *H04N 1/21*     (2006.01)
    *H04N 1/23*     (2006.01)
    *G06K 15/02*    (2006.01)

(52) U.S. Cl.
    CPC ............. *H04N 1/2376* (2013.01); *H04N 1/21* (2013.01)

(58) Field of Classification Search
    None
    See application file for complete search history.

(56) References Cited

U.S. PATENT DOCUMENTS

| 6,172,761 B1* | 1/2001 | Ohtani | G06K 15/02 |
| | | | 358/1.14 |
| 2004/0202492 A1* | 10/2004 | Kuboki | H04N 1/00063 |
| | | | 399/82 |
| 2006/0224559 A1* | 10/2006 | Abiko | H04N 1/32609 |
| 2008/0212123 A1* | 9/2008 | Mizutani | G06F 21/608 |
| | | | 358/1.13 |
| 2008/0259399 A1* | 10/2008 | Wada | G06F 3/1241 |
| | | | 358/1.15 |
| 2009/0279119 A1* | 11/2009 | Gerega | G03G 15/5087 |
| | | | 358/1.15 |
| 2010/0110493 A1* | 5/2010 | Kato | G06F 3/1208 |
| | | | 358/1.15 |

(Continued)

FOREIGN PATENT DOCUMENTS

| JP | 2001054055 | * | 2/2001 | ............. H04N 5/91 |
| JP | 2004086663 | * | 3/2004 | ............. G06F 3/12 |
| JP | 2004086664 | * | 3/2004 | ............. G06F 3/12 |

(Continued)

*Primary Examiner* — Beniyam Menberu
(74) *Attorney, Agent, or Firm* — VENABLE LLP

(57) ABSTRACT

An image forming apparatus incudes a printer and a controller. The controller causes the image forming apparatus to generate thumbnail images of a part of a plurality of pages of image data stored in an external storage medium, cause the printer to print onto one or more sheets the generated thumbnail images and index information corresponding to the printed thumbnail images, and then cause the printer to stop printing based on performing printing of the generated thumbnail images. In addition, a user is allowed to select whether or not to perform printing thumbnail images of pages of image data following the part of the plurality of pages of the image data.

10 Claims, 21 Drawing Sheets

(56) References Cited

U.S. PATENT DOCUMENTS

2012/0127505 A1* 5/2012 Kuboki .............. H04N 1/00002
  358/1.13
2020/0125307 A1* 4/2020 Kitayama .......... H04N 1/00076

FOREIGN PATENT DOCUMENTS

| | | | | |
|---|---|---|---|---|
| JP | 2004114527 | * | 4/2004 | .............. B41J 29/46 |
| JP | 2004304717 | * | 12/2004 | .............. H04N 5/91 |
| JP | 2004361814 | * | 12/2004 | .............. B41J 29/38 |
| JP | 2005182980 | * | 7/2005 | .............. G11B 7/24 |
| JP | 2005-335068 A | | 12/2005 | |
| JP | 2005335068 | * | 12/2005 | .............. B41J 21/00 |
| JP | 2007130794 | * | 5/2007 | ................ B41J 5/30 |
| JP | 2007208583 | * | 8/2007 | ................ G06F 3/12 |
| JP | 2008242935 | * | 10/2008 | ................ G06F 3/12 |
| JP | 2009107175 | * | 5/2009 | ................ G06F 3/12 |
| JP | 2012040818 | * | 3/2012 | ................ G06F 3/12 |
| JP | 2014154041 | * | 8/2014 | ................ G06F 3/12 |
| JP | 2017132197 | * | 8/2017 | ................ G06F 3/12 |
| JP | 2020149375 | * | 9/2020 | ................ B41J 2/21 |

* cited by examiner

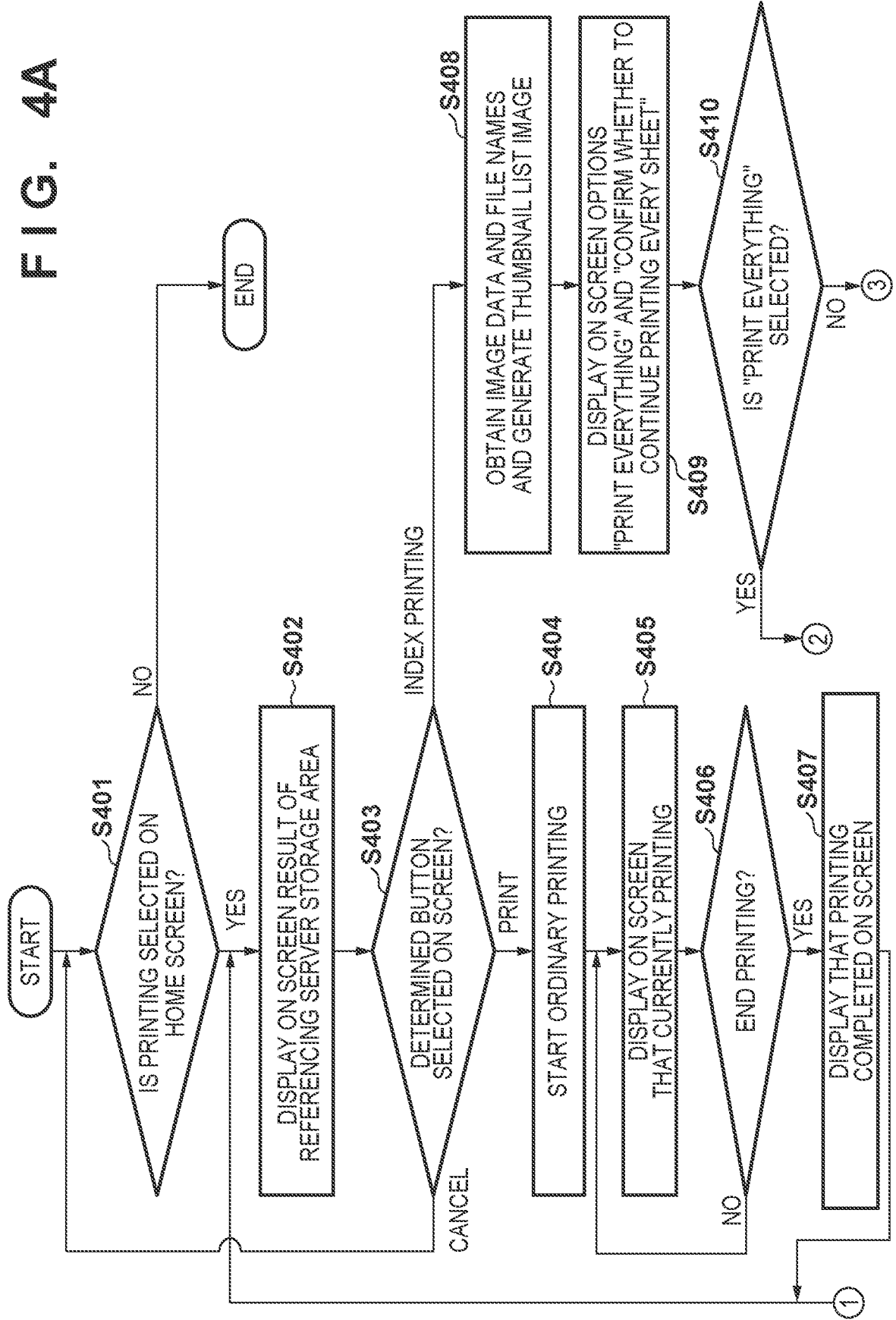

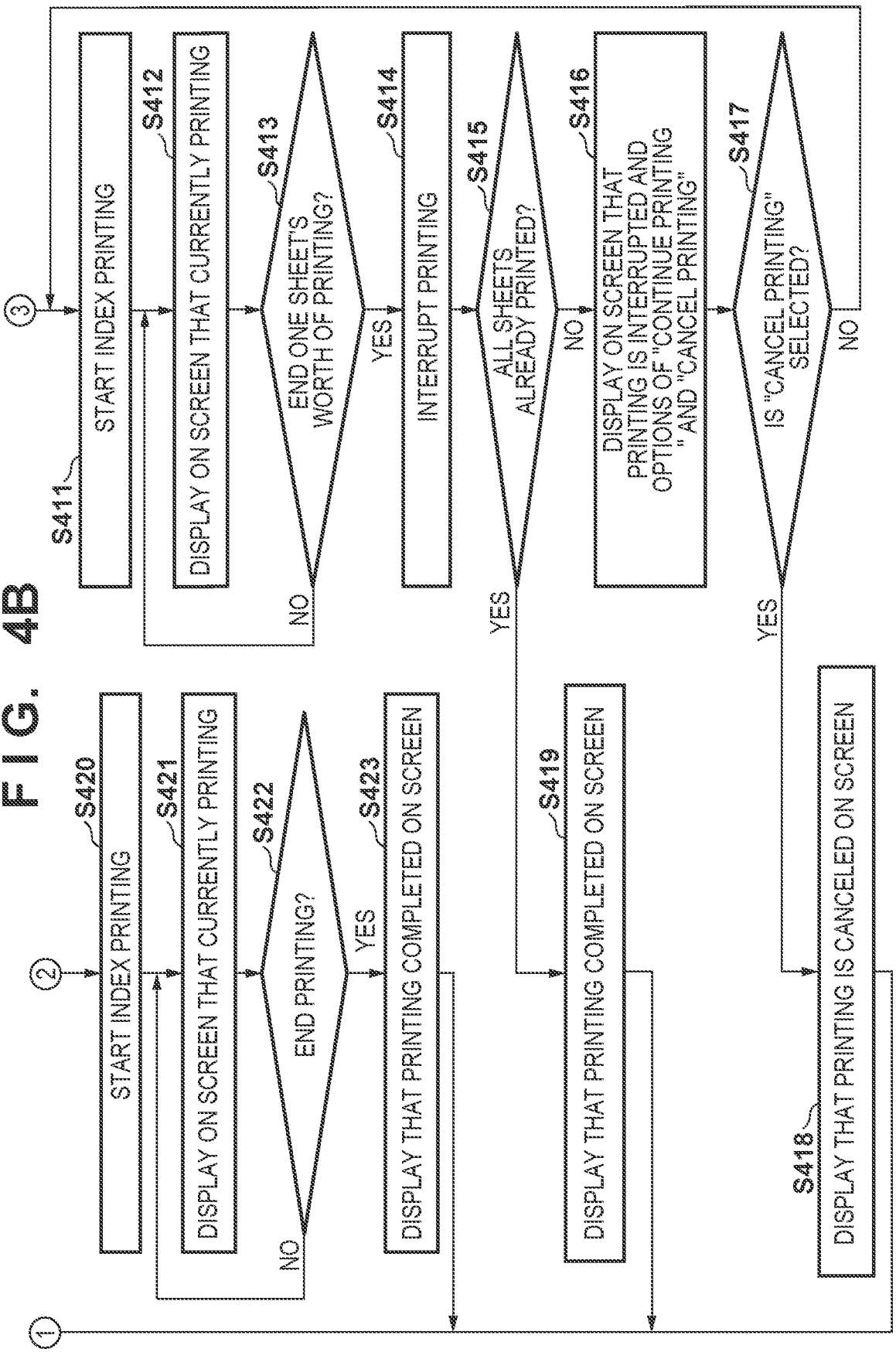

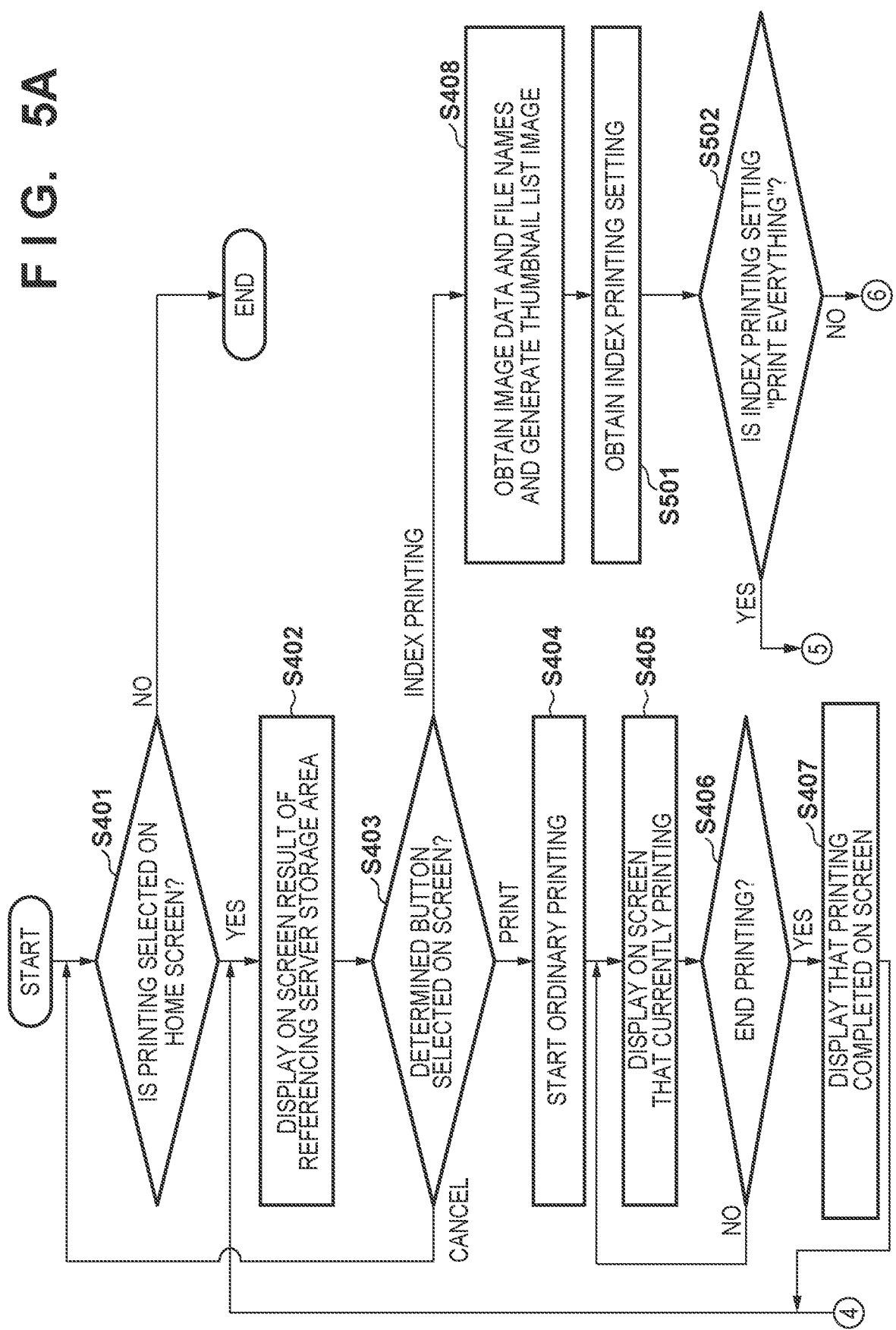

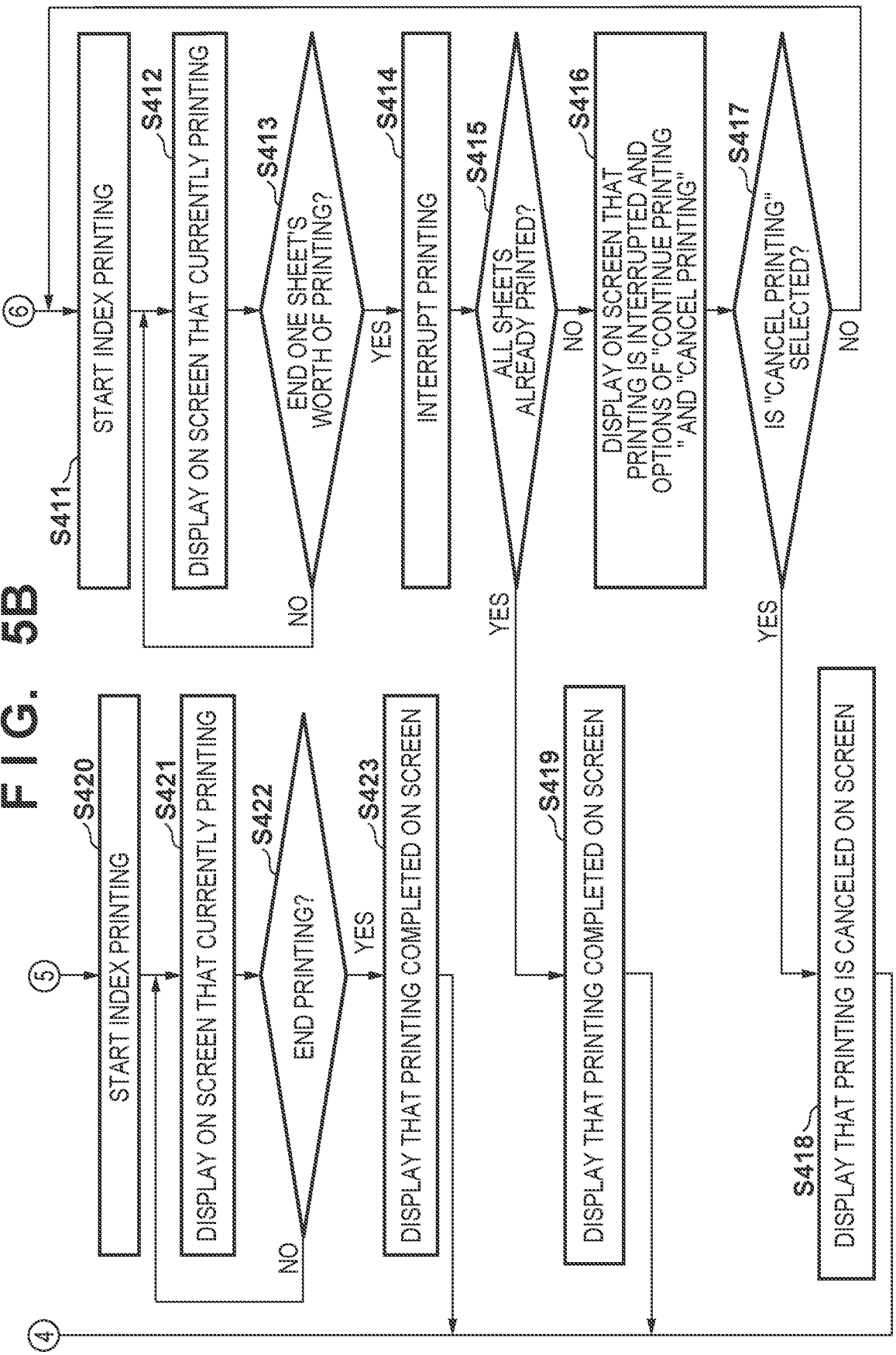

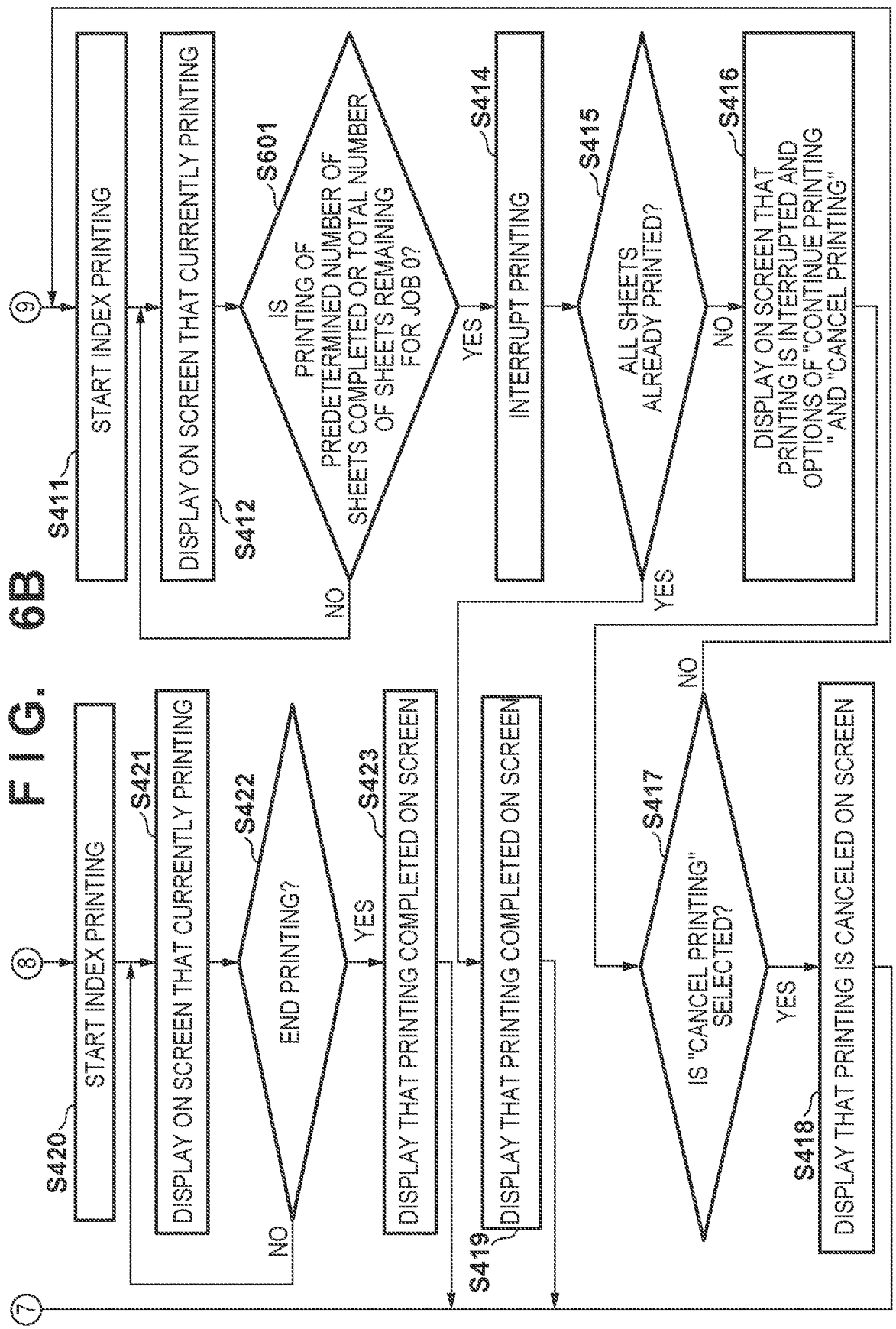

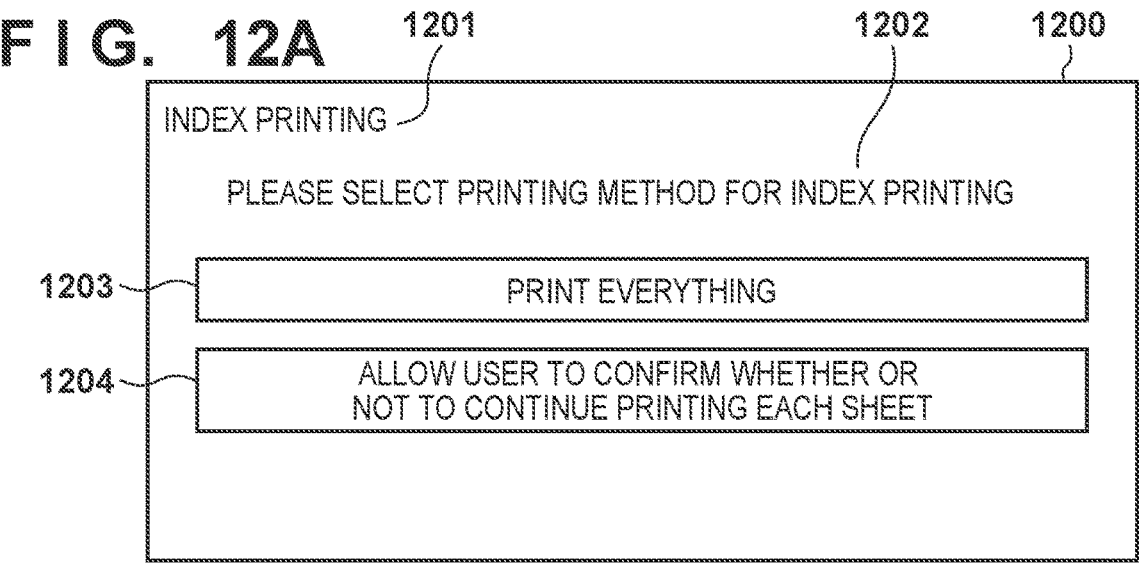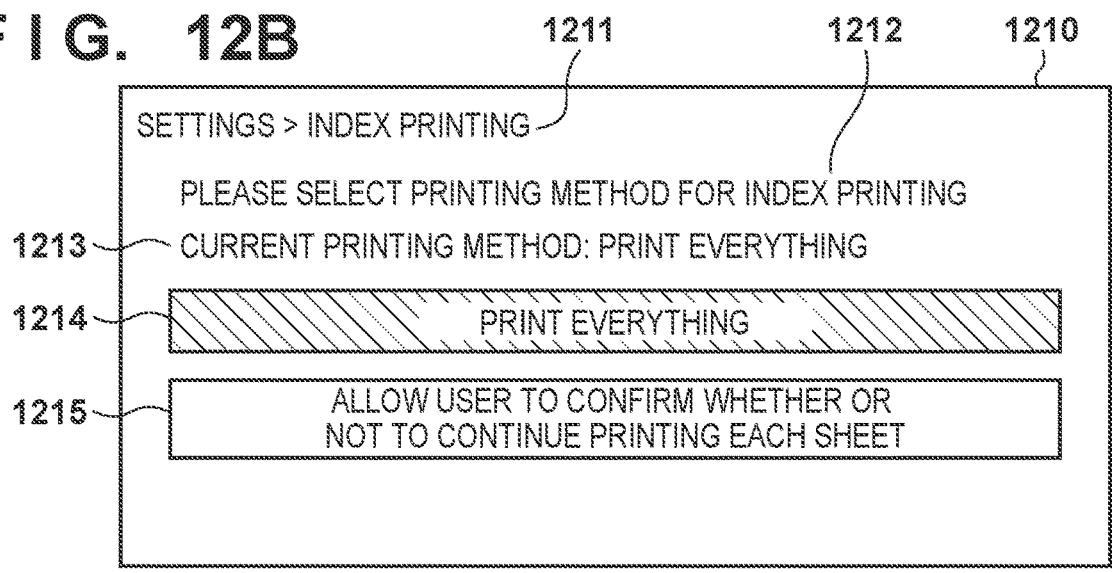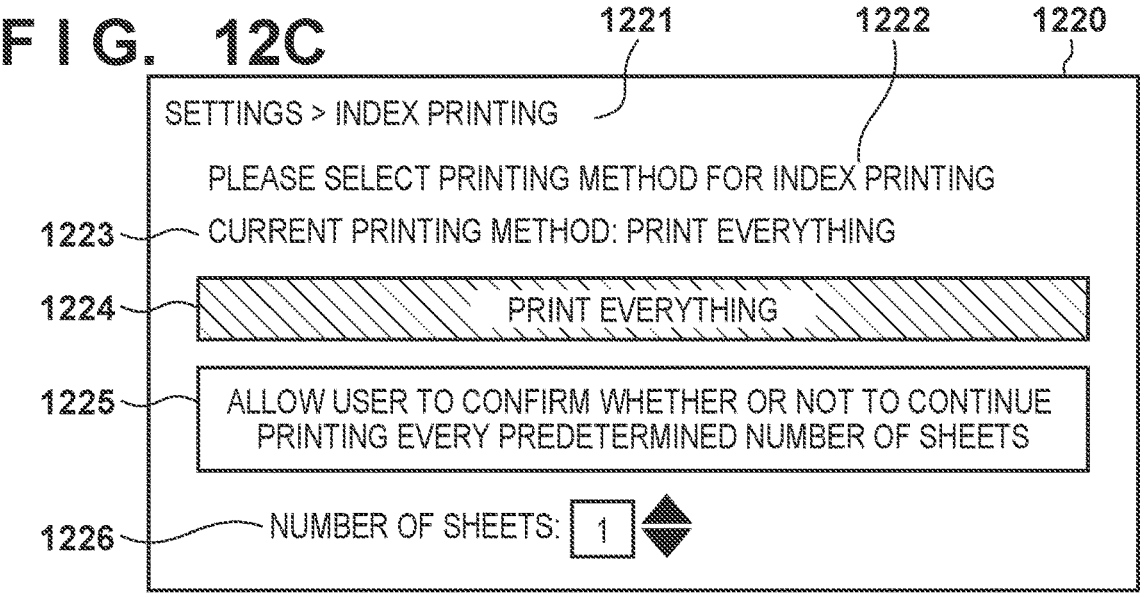

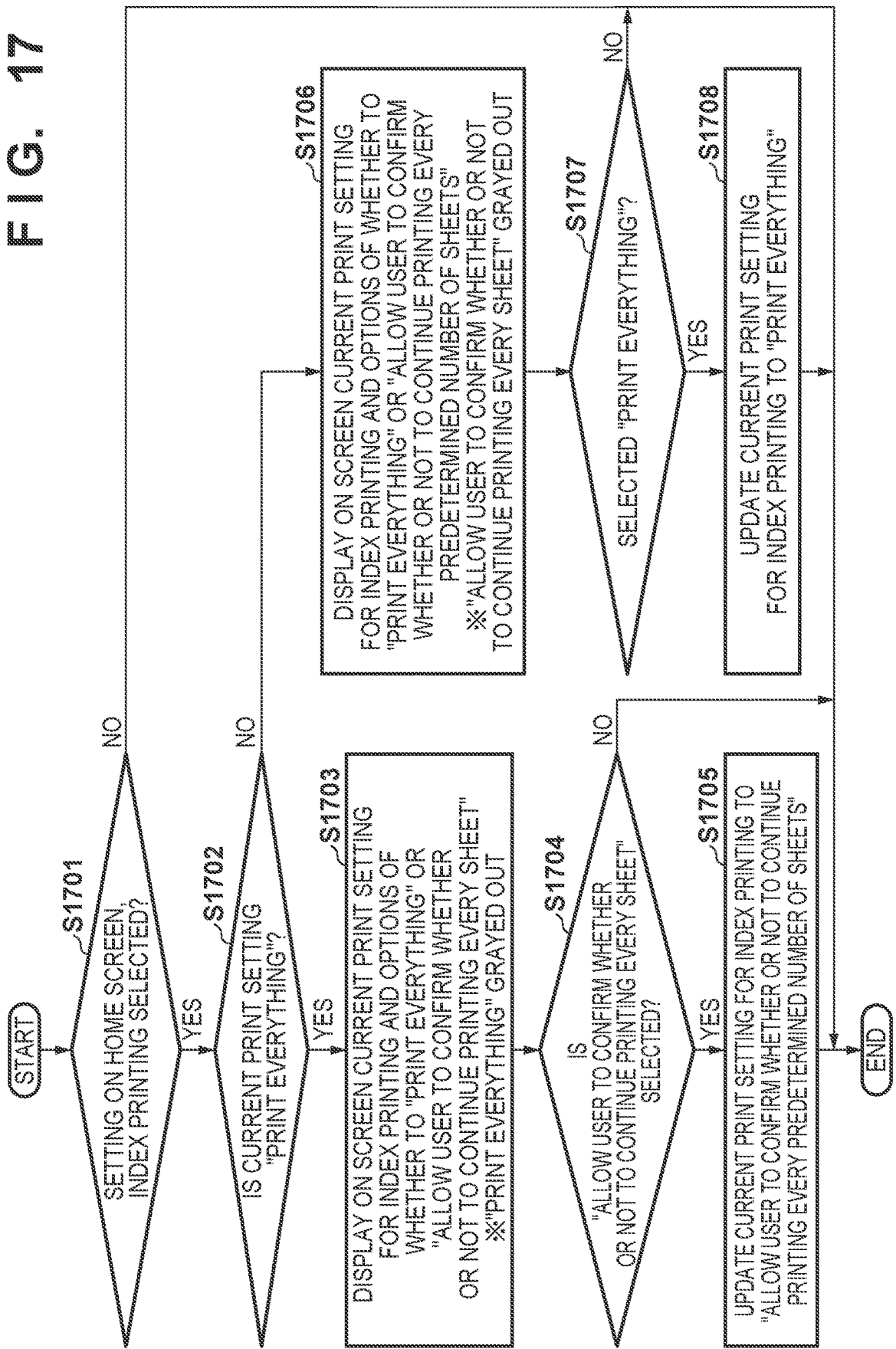

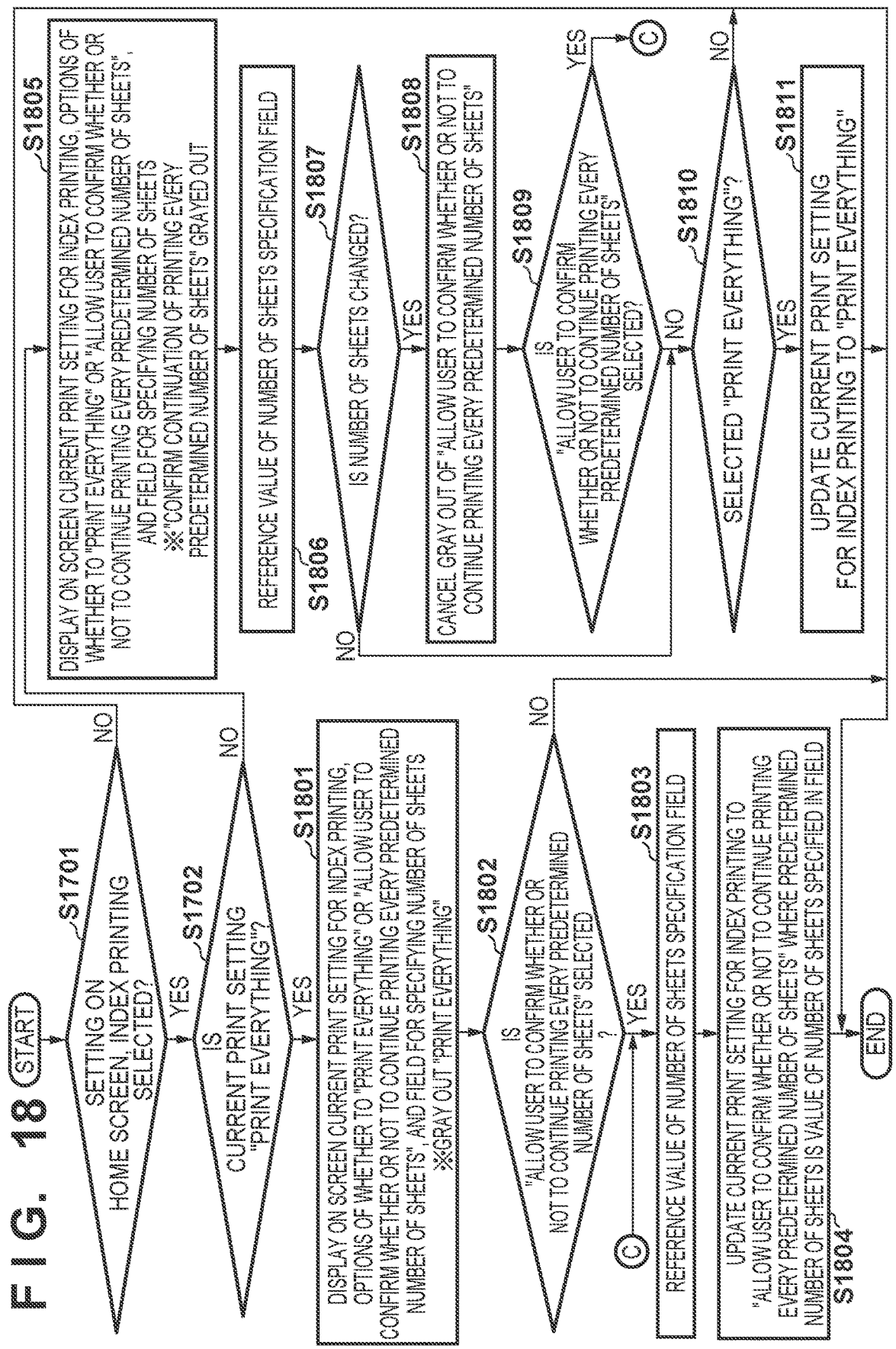

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

The image forming apparatus, such as a copying machine, is provided with a function for printing image data stored in a particular storage area, such as a server, a cloud, or a USB memory (hereinafter, usually referred to as "ordinary printing"). Image forming apparatuses now have a preview function that allows a preview display of an image to be ordinarily printed, and a user can decide the image to be printed on the preview display, the user may select the image and ordinarily print on the basis of the preview display. Meanwhile, in the case of an image forming apparatus that does not have such a preview function, an ordinary printing instruction may be given by specifying a file name of an image, but the file name of the image that a user wants to print by ordinary printing may not be known. In this case, by performing index printing, an image (hereinafter, referred to as thumbnail list image) in which reduced images of a plurality of image data stored in a target storage area are associated with file names is printed. Index printing is a function for printing a list of images (thumbnail images), where the image size of each image of a plurality of image data stored in a specific storage area is reduced, in association with the file names of the respective images. The user can refer to the printed thumbnail list image, find the file name of the image to be printed ordinarily, specify the file name, and perform ordinary printing of the image.

Japanese Patent Laid-Open No. 2005-335068 describes an image processing apparatus capable of performing index printing and ordinary printing in parallel. According to Japanese Patent Laid-Open No. 2005-335068, in a photograph printing application for printing onto sheets images selected from a plurality of images, the sheets on which the image is printed are sequentially discharged to a first discharge tray. Then, before or during execution of the photograph printing application, thumbnails of images selected for executing the photograph printing application are printed by the sample printing application, and the sheet on which the sample is printed is discharged to a second discharge tray. Thus, it is described that a sample print can be discharged to another discharge tray before or during the execution of the photograph printing application, and the state of the image to be printed can be quickly checked.

When index printing is performed when a larger amount of image data is stored in a storage area in which images to be ordinarily printed are stored, the number of printed sheets of index printing is larger. If a printed sheet contains the image to be printed ordinarily while index printing is currently being performed, no further index printing will be required. In such a case, by canceling the index printing at that time, it is possible to interrupt the subsequent index printing and reduce unnecessary index printing to some extent. However, unnecessary indexes are printed between the cancel instruction and the stoppage of the index printing. In the technique disclosed in Japanese Patent Laid-Open No. 2005-335068, unnecessary photograph prints can be reduced by executing the index printing, but the index printing is cancelled when the target image is found as in the case described above. Thereby, the elimination of unnecessary index printing is not considered in the prior art.

SUMMARY OF THE INVENTION

An aspect of the present invention is to eliminate the above-mentioned problem with conventional technology.

A feature of the present invention is to provide a technique by which it is possible to reduce unnecessary index printing when performing index printing.

According to a first aspect of the present invention, there is provided an image forming apparatus, comprising: a printer; and a controller that causes the image forming apparatus to: cause the printer to print onto a predetermined number of sheets a portion of list information for a plurality of image data stored in an external storage medium, and then cause the printer to interrupt printing, and allow a user to select whether or not to continue printing a remainder of the list information.

According to a second aspect of the present invention, there is provided a method of controlling an image forming apparatus, the method comprising: causing printing of a portion of list information of a plurality of image data stored in a storage area of an external storage medium onto a predetermined number of sheets, and then causing printing to be interrupted, and allowing a user to select whether or not to continue printing a remainder of the list information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are flowcharts for describing index printing processing by the MFP according to a first embodiment.

FIGS. 5A and 5B are flowcharts for describing index printing processing by an MFP according to a second embodiment.

FIGS. 6A and 6B are flowcharts for describing index printing processing by an MFP according to a third embodiment.

FIG. 12A depicts a view showing an example of a screen which is for selecting the printing method of the index printing and which is displayed on the console unit of the MFP according to the first embodiment.

FIG. 12B depicts a view showing an example of a screen for performing an index printing setting included in an MFP device setting according to the second embodiment.

FIG. 12C depicts a view showing an example of a screen for performing the index printing setting included in the device settings of the MFP according to the third embodiment.

FIG. 17 is a flowchart for describing a procedure for performing an index printing setting in device settings of the MFP according to the second embodiment.

FIG. 18 is a flowchart for describing a procedure for performing an index printing setting in device settings of the MFP according to the third embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined.

Figure 1:
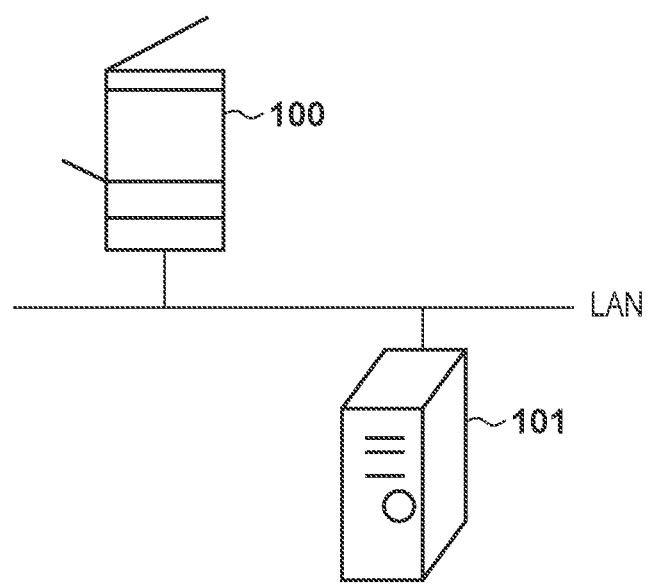
FIG. 1 depicts a view showing an example of a printing system according to an embodiment of the present invention.

FIG. 1 depicts a view showing an example of a printing system according to an embodiment of the present invention.

The image forming apparatus 100 is a so-called multi-function peripheral, and hereinafter, the image forming apparatus 100 is referred to as the MFP 100. In this printing system, the MFP 100 and an external storage medium 101 such as a server are connected via a network (LAN), and communication is performed between them. The external storage medium 101 stores one or more files of image data that can be ordinary printed. In the embodiment, it is assumed that the external storage medium 101 is, for example, a server (information processing apparatus) and performs printing, using the MFP 100, of an index (list information) of the image data stored in the storage area of the server. However, the present invention is not limited to this, and, for example, the MFP 100 may be connected to a USB memory or a cloud, and index printing of the image data stored in the storage area of the USB memory or the cloud may be performed. Hereafter, the external storage medium 101 will be described as the server 101.

Figure 2:
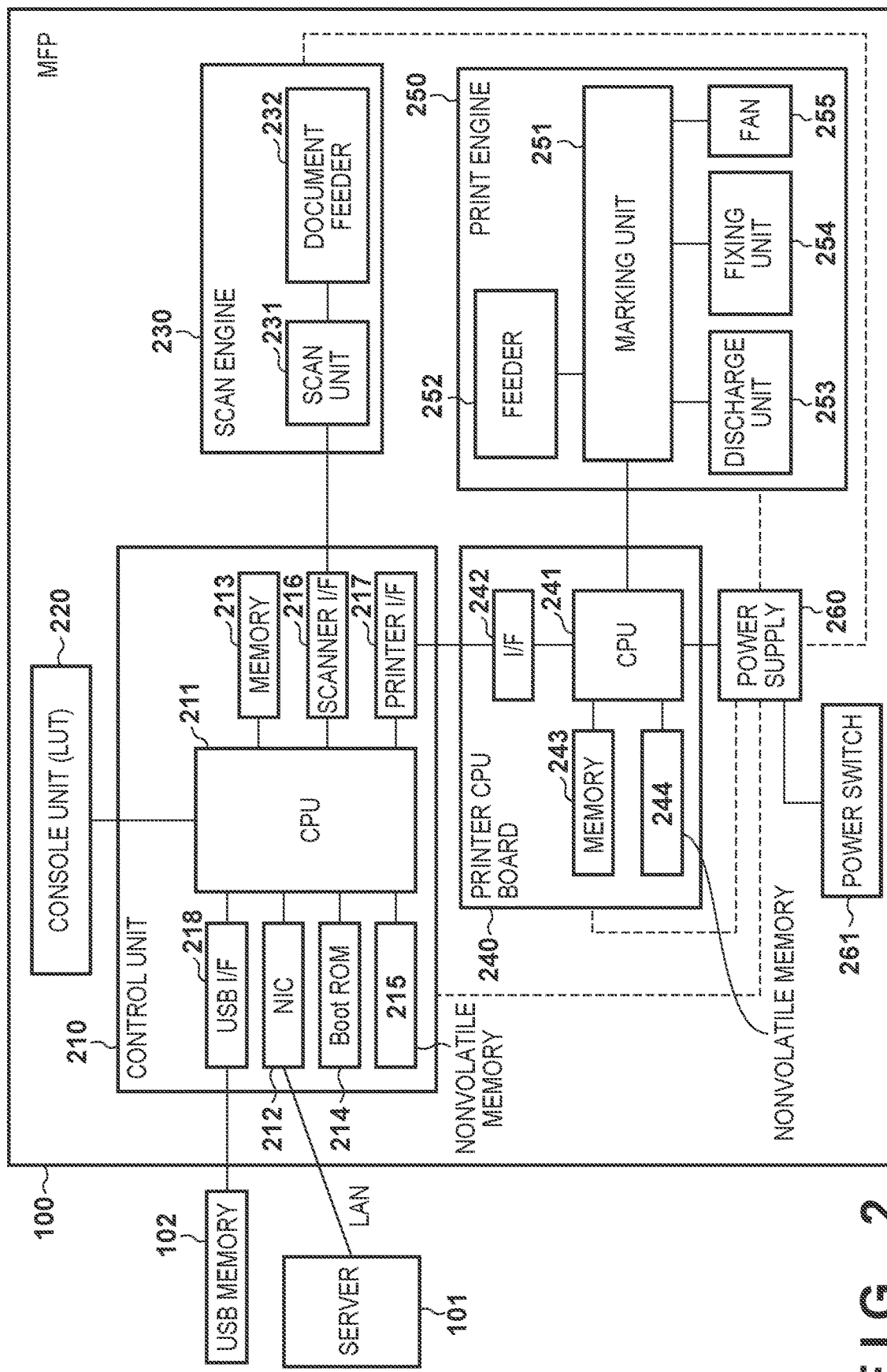
FIG. 2 is a block diagram for describing a hardware configuration of an MFP according to the embodiment.

FIG. 2 is a block diagram for describing a hardware configuration of the MFP 100 according to the embodiment.

The MFP 100 comprises a scan engine 230 and a print engine 250. The MFP 100 further includes a control unit 210 such as a CPU board, a console unit 220, a printer CPU board 240, a power supply 260, and a power switch 261. The scan engine 230 includes a scan unit 231 and a document feeder 232. The print engine 250 includes a marking unit 251 for performing charging, exposure, development, and transfer, a feeder 252, a discharge unit 253, a fixing unit 254, and a fan 255.

The scan unit 231 of the scan engine 230 optically scans a document, and converts an image of the document into digital image data. The document feeder 232 on which a document bundle is placed feeds documents one by one to the scan unit 231. The scan engine 230 transmits image data obtained by scanning a document to the control unit 210.

The marking unit 251 of the print engine 250 prints an image on the fed sheet. The feeder 252 feeds sheets one by one from the stacked sheet bundles to the marking unit 251. The discharge unit 253 discharges the printed sheets to a discharge tray. The fixing unit 254 applies heat and pressure to a sheet onto which a toner image has been transferred by the marking unit 251 to fix the toner image to the sheet. A fan 255 is a fan for cooling the print engine 250.

The console unit 220 provides a local user interface (LUI) for operating the MFP 100, and includes a touch panel for touch panel operations, a display unit for displaying screens, hard keys for key input, and the like.

The control unit 210 is connected to the respective units described above, and a controller mounted in the control unit 210 executes jobs on the MFP 100. The control unit 210 is a general-purpose CPU system, and includes a CPU 211 for controlling the entire CPU board, a memory 213 used by the CPU 211 as a work memory, and a boot ROM 214 including a boot program. The control unit 210 further includes an NIC 212 for external connection via a network, a USB I/F 218 for controlling input and output to and from a USB memory 102, and a nonvolatile memory 215 including firmware. In the embodiment, the USB memory 102 is not required because the server 101 is an external storage medium connected to the MFP 100. A non-volatile memory 215 may be mounted on the CPU board or may be connected to the CPU board. The control unit 210 is connected to the scan engine 230 by a scanner I/F 216. Further, the control unit 210 is connected to the printer CPU board 240 via a printer I/F 217 and an I/F 242. The printer CPU board 240 includes a CPU 241 for controlling the board 240 as a whole, a memory 243 that the CPU 241 uses as a work memory, and a nonvolatile memory 244.

The dotted line in FIG. 2 shows the power supply line. The power supply 260 supplies power to the control unit 210, the scan engine 230, the printer CPU board 240, and the print engine 250. A power switch 261 is a hardware switch for controlling whether a supply of power is on or off. When the power switch 261 is turned on, a boot program of the boot ROM 214 is read into the memory 213, and when the CPU 211 executes the program, various hardware settings and OS activation are executed. When the processing of the boot ROM 214 is completed, a program (firmware) of the controller stored in the nonvolatile memory 215 is loaded (deployed) into the memory 213, and the CPU 211 executes the deployed program, so that the processing can be performed by the MFP 100 as shown in the flowchart described later. Thus, for example, it is possible to accept and execute jobs in the MFP 100.

Figure 3:
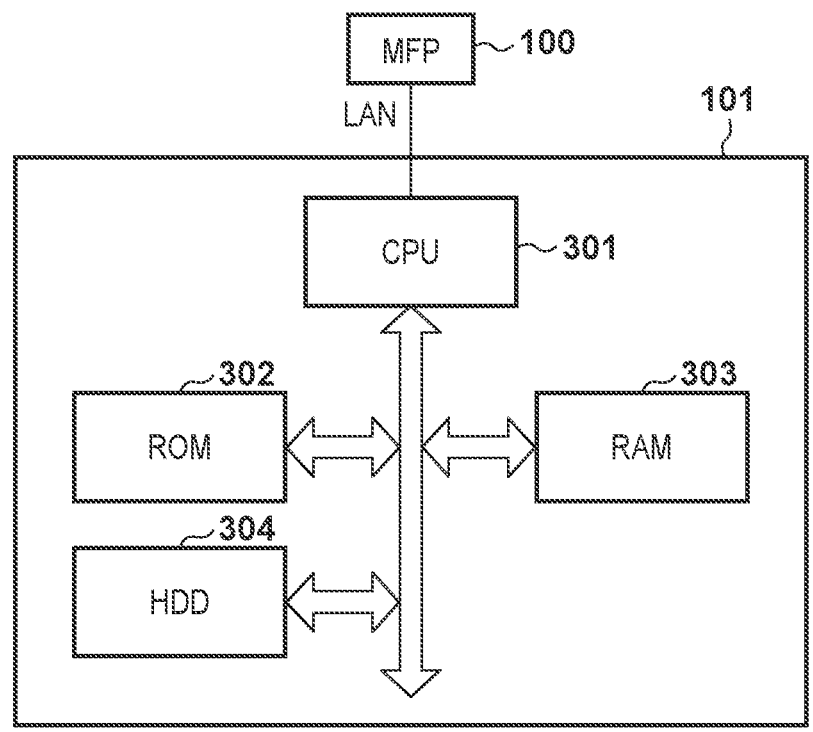
FIG. 3 is a block diagram for describing a hardware configuration of a server according to the embodiment.

FIG. 3 is a block diagram for describing a hardware configuration of the server 101 according to the embodiment.

The server 101 includes a CPU 301, a ROM 302, a RAM 303, and an HDD 304. These components are connected via a bus through which they can transmit and receive data to each other. The CPU 301 deploys various programs stored in the ROM 302 and the HDD 304 to the RAM 303, and executes the deployed programs. This allows the CPU 301 to comprehensively control the respective components and cause the server 101 to operate. The ROM 302 contains a program for controlling the operation of the server 101. The ROM 302 also stores management data or the like unique to the server 101. The RAM 303 functions as a work memory, and programs stored in the ROM 302 and the HDD 304 are loaded (deploy) and temporary data is stored in the RAM 303. The CPU 301 can also perform data communication with the MFP 100 connected via a network (LAN).

The first embodiment to the fifth embodiment of the present invention will be described below based on the above-described configuration. In each of the embodiments, the configuration of the above-described print system, the MFP 100, the hardware configuration of the servers 101, and the like are the same.

First Embodiment

First, the first embodiment of the present invention will be described. Index printing in the first embodiment relates to a mechanism for allowing a user to select a method of performing index printing. In the first embodiment, the user is allowed to select whether to print the total number of pages of the index without interruption, or whether to interrupt printing each time the printing of a one sheet index has completed and allow the user to confirm whether to continue index printing. In addition, when the user is allowed to confirm whether or not to continue index printing each time one sheet of printing is completed by selecting that printing method, index printing is interrupted each time the printing of a one sheet index has completed, and the user is allowed to select whether to continue index printing or to cancel index printing. In the first embodiment, the configuration returns to a directory reference screen of the server 101 after completing or cancelling the index printing and after completing the index printing, but the configuration may be to return to the home screen.

FIGS. 4A and 4B are flowcharts for describing index printing processing by the MFP 100 according to the first embodiment. The process shown in the flowchart is achieved by the CPU 211 executing a program deployed in the memory 213.

First, in step S401, the CPU 211 determines whether or not printing is selected by a user on a home screen displayed on the console unit 220. If printing is selected here, the process proceeds to step S402; otherwise, the process ends. The home screen will be described with reference to FIG. 9.

Figure 9:
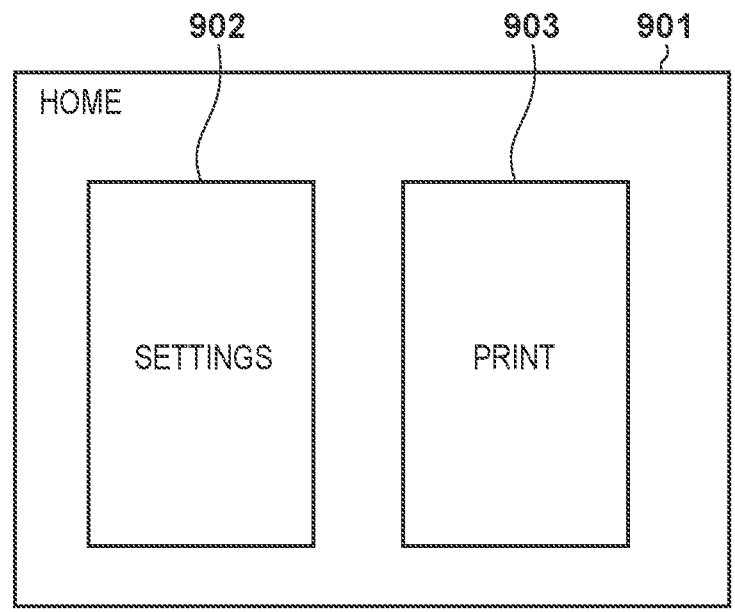
FIG. 9 depicts a view showing an example of a home screen displayed on a console unit of the MFP according to the embodiment.

FIG. 9 depicts a view showing an example of the home screen displayed on the console unit 220 of the MFP 100 according to the embodiment.

Figure 10:
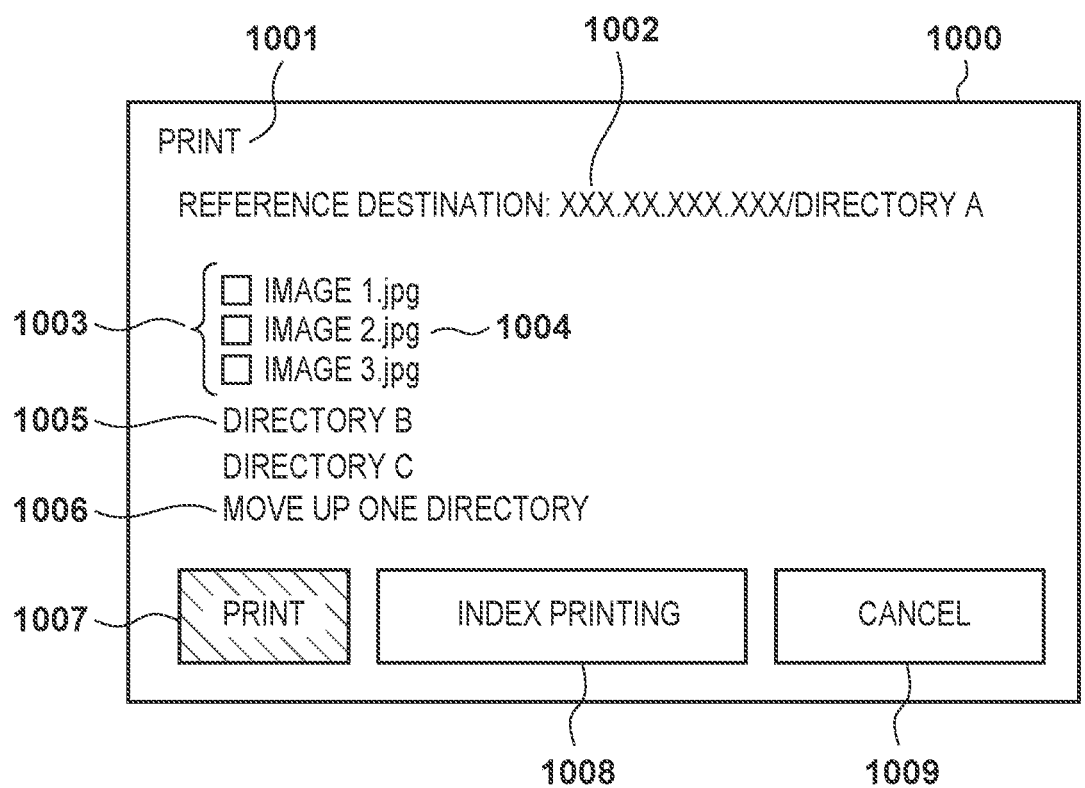
FIG. 10 depicts a view showing an example of a server directory reference screen displayed on the console unit of the MFP according to the embodiment.

Screen 901 shows the entire home screen, and "HOME" indicates that this screen is the home screen. Settings icon 902 indicates an icon for performing device settings of the MFP 100, and when the user selects the settings icon 902, a device setting screen of the MFP is transitioned to. Device settings of the MFP 100 will be described later in the second embodiment. Print icon 903 is an icon for the user to instruct printing, and when the user selects the print icon 903, the process of step S402 of displaying a directory reference screen of the server shown in FIG. 10 is transitioned to. The user can select a desired image file on the directory reference screen to perform ordinary printing or to perform index printing.

In step S402, the CPU 211 communicates with the server 101 to obtain a directory of image data stored in the storage area of the server 101, and displays the obtained result and a screen including a cancel button, a print button, and an index printing button on the console unit 220. This screen will be described with reference to FIG. 10.

FIG. 10 depicts a view showing an example of a server directory reference screen displayed on the console unit 220 of the MFP 100 according to the embodiment.

Screen 1000 shows a directory reference screen of the server, and the title 1001 is PRINT, that is, the title indicates that ordinary printing or index printing of a job that can be performed on this screen. Reference destination 1002 indicates information of the server 101 and a directory that are being referenced, and if the directory to be referenced is changed, the reference destination 1002 changes to a directory to be referenced after the change. The information of the server includes the name of the server and the IP address of the server. In the example of FIG. 10, the IP address of the server 101 is "XXX.XX.XXX.XXX" and directory information indicating "directory A" is displayed.

Check boxes 1003 are used to select a file name of an image stored in directory A. When a check box corresponding to image file 1004 targeted by the user is checked in the check boxes 1003, the image file 1004 corresponding to the checked box is selected to be an ordinary printing target. Directory display 1005 shows a directory one hierarchy deeper than the current directory (directory A). When directory B of the directory display 1005 is selected, the screen 1000 switches to a screen that refers to the selected directory B. Display 1006 is for moving to a directory that is one shallower than the current directory, and if it is selected, the screen 1000 switches to a screen that refers to the one shallower directory. Print button 1007 indicates an ordinary print execution button and designates ordinarily printing of at least one image file for which the check boxes 1003 is checked. The print button 1007 is grayed out in a state where no file is selected in the check boxes 1003. When at least one image file is selected in the check boxes 1003, the grayout of the print button 1007 is canceled, and ordinary printing can be performed. Index printing button 1008 designates index printing. Cancel button 1009 is a button that instructs the user to cancel all selections on this screen and return to the home screen.

Next, the process proceeds to step S403, and the CPU 211 branches the process according to the button selected by the user on the directory reference screen 1000 of FIG. 10. If the user presses the cancel button 1009 or a home button (not illustrated), the process returns to step S401. On the other hand, the processing proceeds to step S404 when the user selects the file name of image data in the check boxes 1003 and presses the print button 1007 on the screen 1000. Alternatively, when the user presses the index printing button 1008, the process proceeds to step S408.

In step S404, the CPU 211 starts ordinary printing of the image file selected on the screen of FIG. 10. Then, the process proceeds to step S405, and the CPU 211 displays on the console unit 220 that printing of ordinary printing is in progress. An example of a screen displayed at this time is shown in FIG. 13B.

Figure 13A:
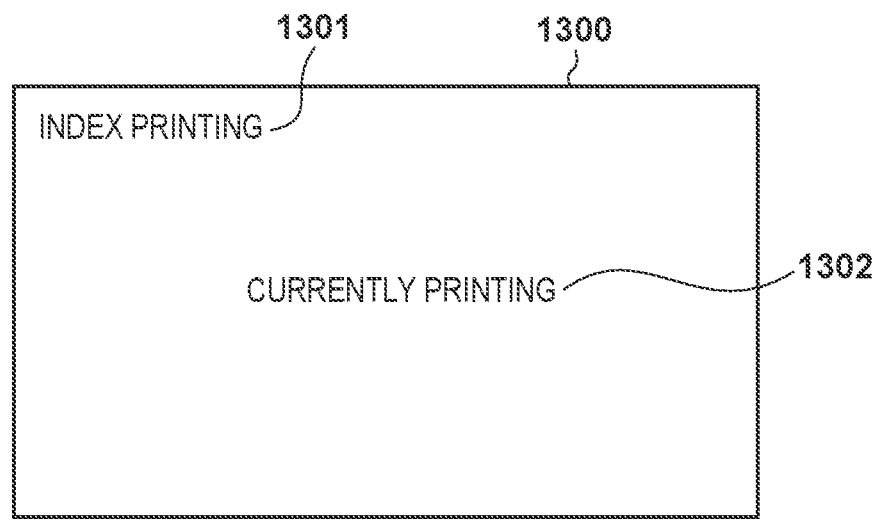
FIG. 13A depicts a view showing an example of a screen indicating that index printing is in progress, which is displayed on the console unit of the MFP according to the embodiment.
Figure 13B:
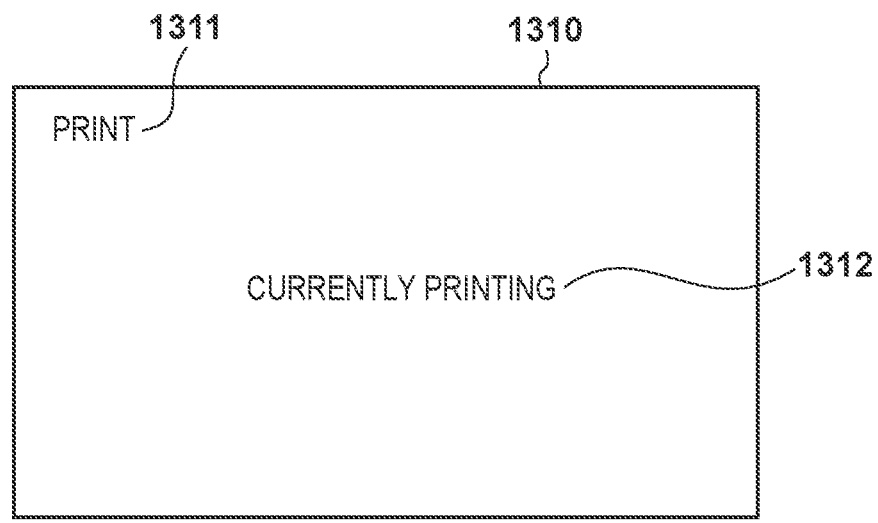
FIG. 13B depicts a view showing an example of a screen indicating that ordinary printing is in progress, which is displayed on the console unit of the MFP according to the embodiment.

FIG. 13B depicts a view showing an example of a screen indicating that ordinary printing is in progress, which is displayed on the console unit 220 of the MFP 100 according to the embodiment.

Screen 1310 is a screen indicating that ordinary printing is being performed, and title 1311 indicates an ordinary printing job status. Message 1312 indicates that printing is in progress.

Next, the process proceeds to step S406 and the CPU 211 determines whether or not printing of ordinary printing has completed, and then proceeds to step S407 when it has completed, and proceeds to step S405 when it has not completed. In step S407, the CPU 211 displays in a screen on the console unit 220 that printing of ordinary printing has been completed, and proceeds to step S402. An example of this screen is illustrated in FIG. 16B.

Figure 16A:
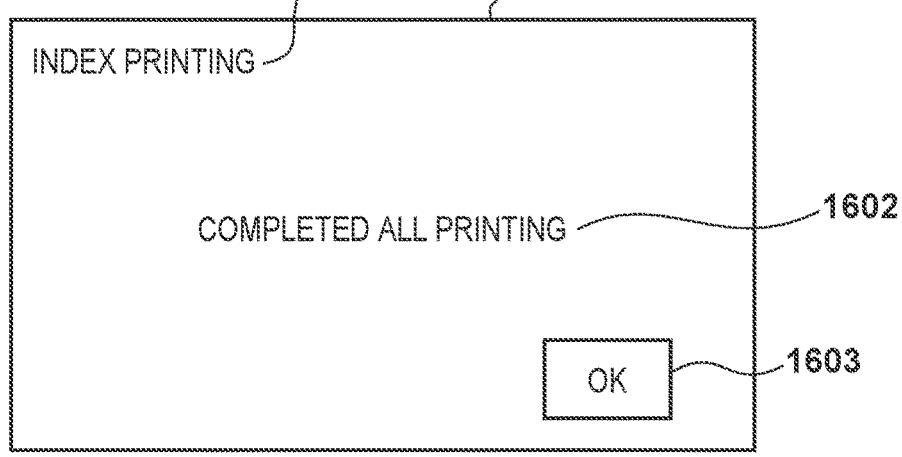
FIG. 16A depicts a view showing an example of a screen that is displayed when index printing has completed in the MFP according to the embodiment.
Figure 16B:
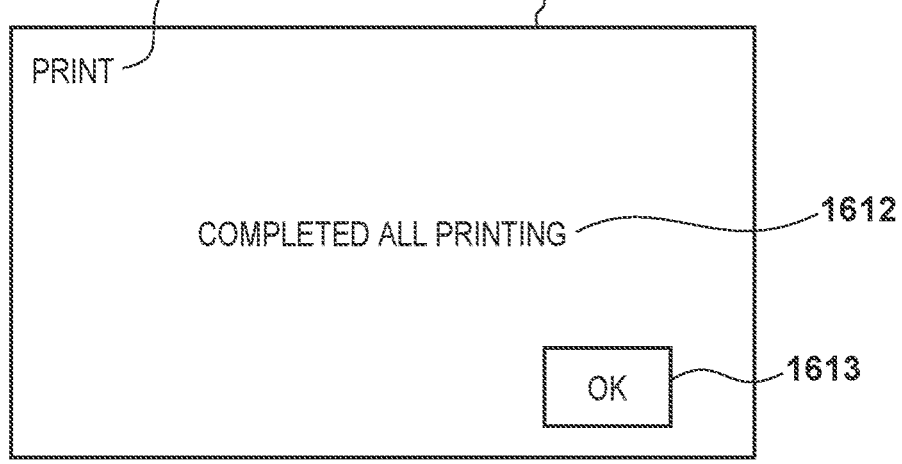
FIG. 16B depicts a view showing an example of a screen that is displayed on the console unit when ordinary printing has completed in the MFP according to the embodiment.

FIG. 16B depicts a view showing an example of a screen that is displayed on the console unit 220 when ordinary printing has been completed in the MFP 100 according to the embodiment.

Screen 1610 shows a screen indicating that ordinary printing has been completed. Title 1611 shows "PRINT" which means ordinary printing. Message 1612 indicates that printing has completed. When OK button 1613 is selected, the process returns to the directory reference screen 1000 of the server shown in FIG. 10.

Next, a case in which index printing is selected on the screen of FIG. 10 will be described.

Figure 11:
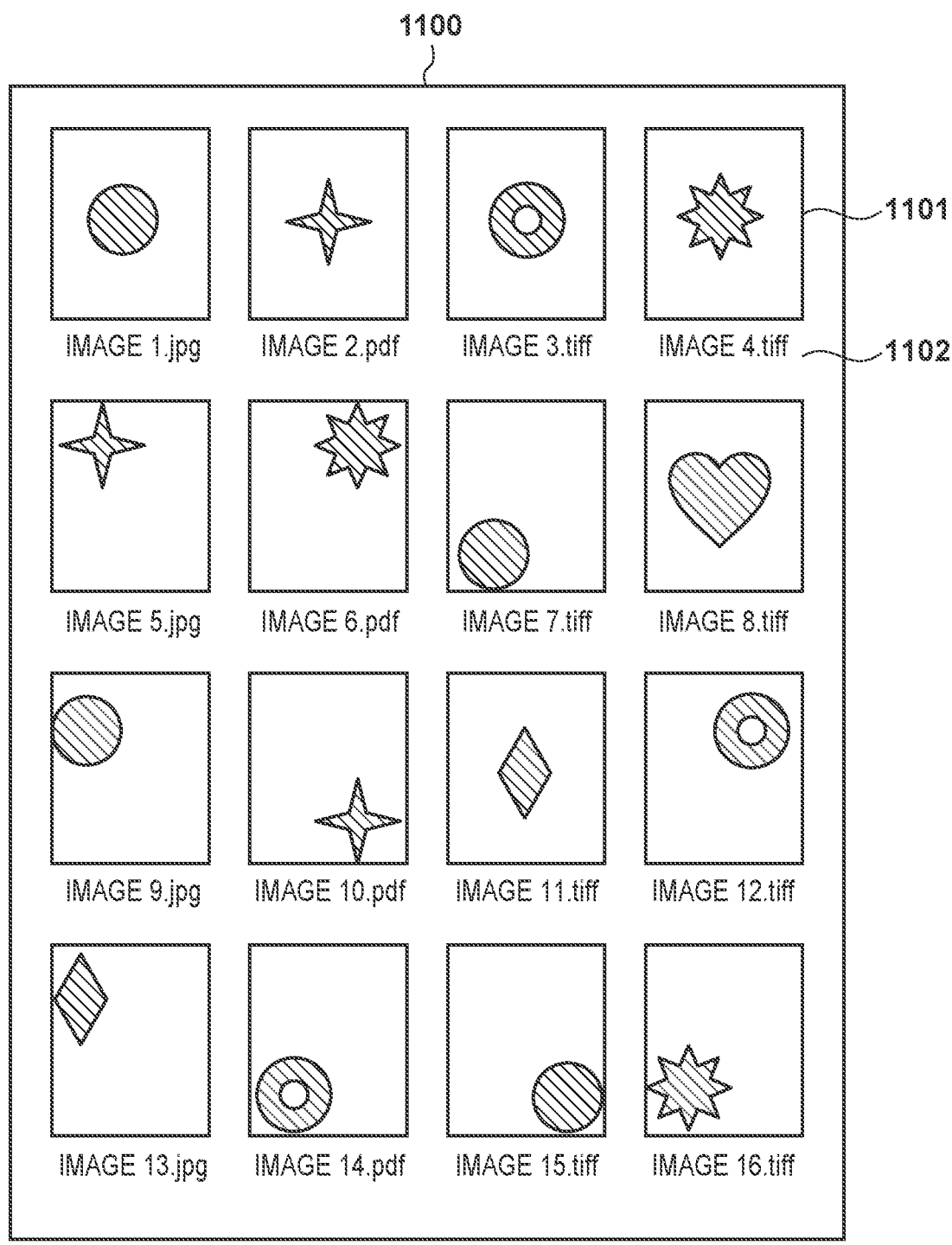
FIG. 11 depicts a view showing an example of a thumbnail list image printed by index printing in the MFP according to the embodiment.

In step S408, the CPU 211 obtains image data stored in the storage area of the server 101 and file names through the network, and generates a thumbnail list image as shown in FIG. 11, for example, from the obtained image data and the file names. FIG. 11 shows an example of a printed thumbnail list image, and a description thereof will be given later. The server 101 may generate a thumbnail list image from the image data and the file names, and the MFP 100 may obtain the generated thumbnail list image from the server 101 through the network. Further, the generated thumbnail list image may be configured to include information of the server and information of the directory in addition to the image data and the file names.

FIG. 11 depicts a view showing an example of a thumbnail list image printed by index printing in the MFP 100 according to the embodiment.

Index print sheet 1100 represents the entire thumbnail list image printed by index printing. Thumbnail image 1101 indicates a thumbnail image into which one of the image data stored in the directory that are index printing targets was reduced for use as a thumbnail list image. File name 1102 indicates the file name of the thumbnail image 1101. In FIG. 11, a thumbnail list image is constituted by only a list of reduced image data in the target directory and the file names, but it may be configured to include other information or directories of the target server.

Next the process proceeds to step S409, the CPU 211 displays a screen for selecting the printing method of the index printing to allow the user to select the printing method. Specifically, options are displayed on the screen to allow the user to select whether to print everything without interruption of the index printing or whether to interrupt the index printing each time one sheet is printed and check with the user as to whether or not to continue index printing. An example of this screen is illustrated in FIG. 12A.

FIG. 12A depicts a view showing an example of a print method selection screen of the index printing displayed on the console unit 220 of the MFP 100 according to the first embodiment.

Screen 1200 shows a screen for selecting the printing method of the index printing. Title 1201 indicates that this screen is a screen for selecting the printing method of the index printing. Message 1202 is a message prompting the user to select the printing method of the index printing. Button 1203 is a button for selecting to print the total number of sheets without interruption as the printing method of the index printing. Button 1204 is a button for selecting to interrupt the index printing every sheet as the printing method of the index printing, and allow the user to confirm whether or not to continue the index printing.

Next, the processing proceeds to step S410, and the CPU 211 determines whether or not the button 1203, i.e., the setting for printing everything without interrupting the index printing, has been selected on the screen of FIG. 12A; if so, the processing proceeds to step S420, and otherwise the processing proceeds to step S411.

In step S411, the CPU 211 begins to print the thumbnail list image generated in step S408. Next, the processing proceeds to step S412 and the CPU 211 displays on a screen that the index printing is in progress. An example of this screen is illustrated in FIG. 13A.

FIG. 13A depicts a view showing an example of a screen which is displayed on the console unit 220 of the MFP 100 and which indicates that index printing is in progress according to the first embodiment.

Screen 1300 is a screen indicating that index printing is in progress. Title 1301 indicates that an index printing job is in progress. Message 1302 indicates that index printing is in progress.

Next, the processing proceeds to step S413, and the CPU 211 determines whether or not printing of one sheet's worth of thumbnail list images (an index list) has completed, and if so, the processing proceeds to step S414, and returns to step S412 when printing of the thumbnail list images for one sheet has not completed.

In step S414, the CPU 211 interrupts index printing. Then, the process proceeds to step S415, and the CPU 211 determines whether or not printing of thumbnail list images corresponding to the total number of sheets has completed, and if so, the processing proceeds to step S419, and the CPU 211 displays that printing of the index printing has completed, and the processing proceeds to step S402. On the other hand, if, in step S415, the CPU 211 determines that printing of the thumbnail list image for the total number of sheets has not completed, the processing proceeds to step S416. In step S416, the CPU 211 displays on a screen a message indicating that index printing is interrupted and displays options that allow the user to choose whether to continue index printing or cancel the index printing. An example of this screen is illustrated in FIG. 14A.

Figure 14A:
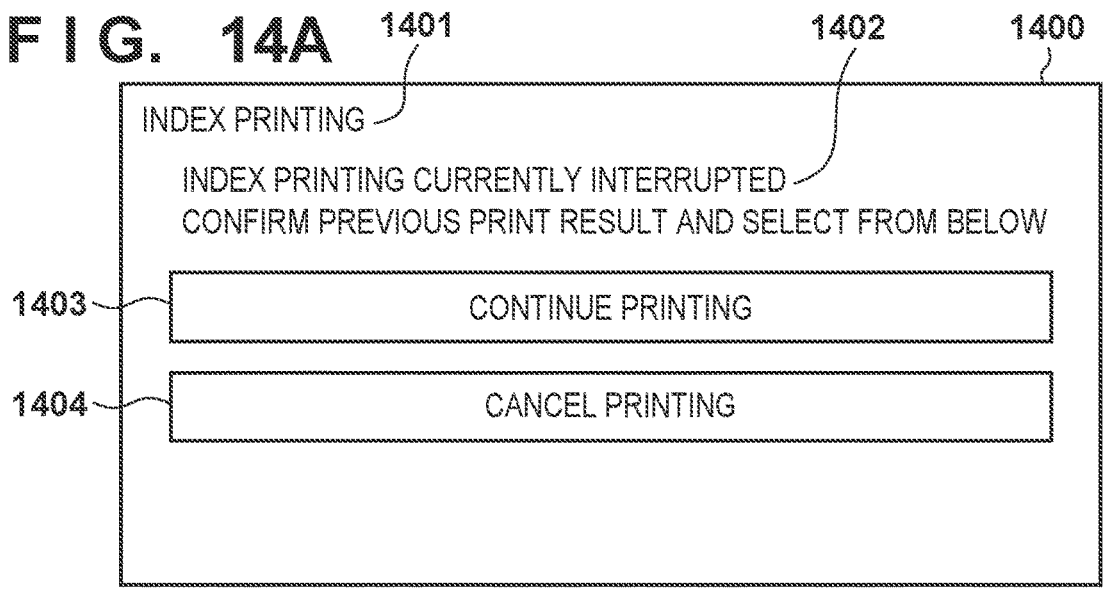
FIG. 14A depicts a view illustrating an example of a screen for displaying that index printing is being interrupted and displaying options for continuing or cancelling the printing in the MFP according to the first embodiment.

FIG. 14A depicts a view illustrating an example of a screen for displaying that index printing is being interrupted and displaying options for continuing or cancelling the printing in the MFP 100 according to the first embodiment.

Screen 1400 is a view illustrating an example of a screen for displaying that index printing is interrupted and displaying options for continuing or cancelling the index printing. Title 1401 indicates the index printing job status. Message 1402 indicates that index printing is interrupted. Button 1403 is a button for instructing to continue index printing one sheet at a time. When the button 1403 is selected, the index printing of a respective sheet is continued. Button 1404 is a button for instructing to cancel the index printing. When the button 1404 is selected, the index printing is cancelled.

Next, the processing proceeds to step S417, and the CPU 211 determines whether the button 1404 for cancelling printing is pressed on the screen of FIG. 14A, the process proceeds to step S418 if the button 1404 is pressed; otherwise the process returns to step S411. In step S418, the CPU 211 cancels the index printing and displays a screen indicating that the index printing has been cancelled on the console unit 220. An example of this screen is illustrated in FIG. 15.

Figure 15:
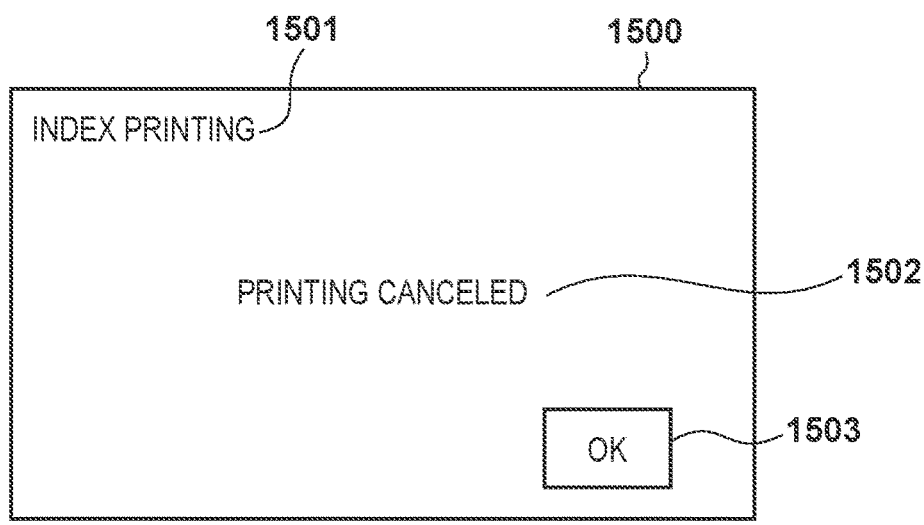
FIG. 15 depicts a view showing an example of a screen indicating that index printing is cancelled, which the MFP displays according to the embodiment.

FIG. 15 depicts a view showing an example of a screen indicating that index printing is cancelled, which the MFP 100 displays according to the first embodiment.

Screen 1500 shows a screen indicating that index printing is cancelled. Title 1501 indicates the index printing job status. Message 1502 is a message indicating that index printing has been cancelled. When OK button 1503 is selected, the process returns to the display of the directory reference screen 1000 of the server shown in FIG. 10 of step S402.

When it is determined in step S415 that the index printing has been completed, the process proceeds to step S419, and the CPU 211 displays on a screen that the index printing has completed. An example of this screen is illustrated in FIG. 16A.

FIG. 16A depicts a view showing an example of a screen displaying the index printing completed in the MFP 100 according to the embodiment.

Screen 1600 shows a screen indicating the index printing completed. Title 1601 indicates the index printing job status. Message 1602 is a message indicating that index printing has completed. When OK button 1603 is selected, the process returns to display the directory reference screen 1000 of FIG. 10 in step S402.

Returning again to FIG. 4A, in step S410, if it is selected to print everything without interrupting the index printing, the process proceeds to step S420 (FIG. 4B) and CPU 211 starts the index printing. Next, the processing proceeds to step S421 and the CPU 211 displays on a screen that the index printing is in progress. This screen corresponds to the above-described FIG. 13A.

Next, the processing advances to step S422, and the CPU 211 determines whether or not the index printing completed, and when it is determined to have completed, the processing proceeds to step S423, and otherwise, the processing proceeds to step S421. In step S423, the CPU 211 displays in a screen that the index printing has completed, and the processing proceeds to step S402. This screen corresponds to the above-described FIG. 16A.

As described above, in the first embodiment, in the index printing, the user is allowed to confirm whether to print everything or to interrupt printing one sheet at a time to allow the user select whether or not to continue printing. Thus, each time an index is printed, the user chooses to interrupt the index printing and confirm whether to continue the index printing. Thus, when the user determines that the printing result of the index printing includes an image to be ordinarily printed, the user can easily cancel the subsequent index printing. Thus, there is the effect that it is possible to eliminate unnecessary index printing by the cancelling of the subsequent index printing after the index of the image to be ordinarily printed targeted by the user is printed.

Second Embodiment

Next, the second embodiment of the present invention will be described. In the second embodiment, in the device settings of the MFP 100, the user is allowed to set whether to print the total number of sheets or to interrupt the index printing every time printing of one sheet is completed, and to allow the user to confirm whether or not to continue the index printing. In the index printing in the second embodiment, the processing of the index printing is switched according to a device setting of an MFP. Further, in this device setting, index printing is interrupted each time one sheet of printing is completed, and when the setting that allows the user to confirm whether to continue printing is selected, index printing is interrupted each time one sheet of printing is completed. Then, the user is allowed to choose whether to continue or cancel index printing, and processing is performed in accordance with the selection. That is, a difference from the first embodiment is that the printing method of index printing is performed based on the device setting of the MFP. That is, in the first embodiment, the above setting is performed on the selection screen for the printing method of the index printing, whereas in the second embodiment, it is specified by a device setting of the MFP. Further, configuration may be such that both the print setting of the index printing of the first embodiment and the second embodiment are possible.

FIGS. 5A and 5B are flowcharts for describing index printing processing by the MFP 100 according to the second embodiment. The process shown in the flowchart is achieved by the CPU 211 executing the program deployed in the memory 213. In FIGS. 5A and 5B, the same reference numerals are assigned to processes common to those in the flowchart of FIGS. 4A and 4B described above, and a description thereof is omitted.

The processing proceeds to step S501 when a thumbnail list image as shown in FIG. 11, for example, is generated in step S408. In step S501, the CPU 211 obtains the print settings for index printing in the device settings of the MFP 100. The procedure for the device setting for index printing corresponds to FIG. 17, and the description thereof will be described later. In addition, since an initial value is set even if the print setting has not been made, processing is performed according to the initial value.

The CPU 2111, having proceeded to step S502, obtains the print setting for index printing included in the device settings of the MFP 100 obtained in step S501 and determines whether printing everything without interrupting the index printing is set. If the setting is for printing everything without interruption, the processing proceeds to step S420; otherwise, if the setting is for interrupting the index printing and allowing the user to choose whether to continue printing, the processing proceeds to step S411. The processing subsequent to this is the same as that of previously described FIGS. 4A and 4B, and therefore description thereof is omitted.

FIG. 17 is a flowchart for describing a procedure for performing an index printing setting in device settings of the MFP 100 according to the second embodiment. The process shown in the flowchart is achieved by the CPU 211 executing the program deployed in the memory 213.

First, when the setting icon 902 is selected on the home screen of FIG. 9 and index printing is selected on the setting screen in step S1701, the processing proceeds to step S1702; otherwise, the process ends. In step S1702, the CPU 211 determines whether the current index printing setting is a value corresponding to printing everything, and if so, the processing proceeds to step S1703; otherwise the processing proceeds to step S1706. The initial value is set even when the user has not made any print settings at all.

In step S1703, the CPU 211 displays a screen that indicates that the current print setting for index printing is for printing everything and includes a button to switch between the print everything setting and the setting for allowing the user to confirm whether to continue index printing one page at a time. Here, the button for switching to the print everything setting is displayed in a grayed out state, and control is performed so that it cannot be selected because it is the current print setting. An example of this screen is illustrated in FIG. 12B.

FIG. 12B depicts a view showing an example of a screen for making the index printing setting which is included in the device settings of the MFP 100 according to the second embodiment.

Screen 1210 shows a screen for the index printing setting included in the device settings of the MFP 100. Title 1211 indicates that the screen 1200 is a screen for the index printing setting which is in the device settings of the MFP 100. Message 1212 is a message prompting the user to select the printing method of the index printing. Message 1213 indicates that the current print setting for index printing is the print everything setting. Button 1214 is a button for switching to the print everything setting as the printing method of the index printing. Note that since the current printing method is the print everything setting, this button 1214 is displayed to be grayed out and cannot be selected by the user. If the message 1213 indicates the method in which the user is allowed to confirm whether or not to continue the current printing setting one sheet at a time, the button 1214 for switching the printing method of index printing to the print everything setting is not grayed out, and when the button 1214 is selected, the setting can be switched to the print everything setting. Button 1215 is a button for switching the print setting of the current index printing to a method for confirming to the user whether to continue index printing one sheet at a time. When this button 1215 is selected, the current index printing setting is switched to the setting for the method of interrupting printing one sheet at a time, and allowing the user to confirm whether or not to continue the index printing.

The processing proceeds to step S1704, and the CPU 211 determines whether or not the button 1215, i.e., the setting to allow the user to confirm whether or not to continue printing every time printing of a sheet is completed, is selected on the screen of FIG. 12B. When it is determined that the setting to allow the user to confirm whether or not to continue printing every time printing of one sheet is completed was selected, the process proceeds to step S1705. When it is determined that the setting to allow the user to confirm whether or not to continue printing every time printing of one sheet is completed is not selected in step S1704, the process ends. In step S1705, the CPU 211 updates the current print setting to the setting value for index printing so that the user is allowed to confirm whether to continue printing one sheet at a time. The index printing setting in the device settings of MFP 100 obtained in step S501 of FIG. 5A corresponds to this setting value.

Meanwhile, in step S1706, the CPU 211 displays on the screen a message indicating that the current index printing setting is for the method of allowing the user to confirm whether to continue printing one sheet at a time, the previously described button 1215, and the button 1214 for switching to the print everything setting. In addition, the button 1215 for switching to the method in which the user is allowed to confirm whether or not to continue index printing each sheet is displayed to be grayed out state and is controlled so as not to be selectable because it is the current printing setting. Furthermore, though no figure is provided for this screen, the message 1213 of this screen is changed to "Confirm continuation of printing every sheet" in FIG. 12B. Then, the button 1215 for switching to confirmation of the continuation of printing for each sheet is grayed out, and corresponding the grayout of the button 1214 for switching to the print everything setting is cancelled.

Proceeding to step S1707, the CPU 211 determines whether the print everything button 1214 has been selected on this screen, and if so, the processing proceeds to step S1708; otherwise the CPU 211 exits this process. In step S1708, the CPU 211 updates the setting indicating print everything from the current print settings of the index printing and terminates this processing. Then, the index printing setting included in the device settings of the MFP 100 obtained in step S501 of FIG. 5A corresponds to this setting value.

As described above, according to the second embodiment, in addition to the effect of the first embodiment described above, it is possible to select whether to print everything or to interrupt printing one sheet at a time in the index printing and allow the user to confirm whether or not to continue index printing. In addition, there is the effect that it is possible to set whether to print everything or whether to allow the user to confirm whether to continue index printing each sheet on not only the index printing screen but also in the device settings of the MFP.

Third Embodiment

Next, the third embodiment of the present invention will be described. In the index printing according to the third embodiment, the user is allowed to confirm whether to print the total number of sheets in the device setting of MFP 100 or to interrupt index printing each time a specified predetermined number of sheets of printing is completed, and to set whether or not to continue index printing. Then, the printing process is switched according to the setting. Further, in the index printing setting, when a method is selected in which index printing is interrupted each time the specified predetermined number of prints are completed and the user is allowed to confirm whether to continue index printing, control is performed as follows. That is, the user is allowed to select whether to continue or cancel index printing each time the predetermined number of sheets of printing is completed, and the process is switched according to the selection. The difference from the second embodiment described above is a period for interrupting the printing of the index printing. In the second embodiment, the printing of one sheet is interrupted each time the index printing is completed, whereas in the third embodiment, the index printing is interrupted each time the printing of the specified predetermined number of index sheets is completed. This is different in that the user is allowed to confirm whether or not the index printing is continued. In addition to specifying the print setting of the index printing in the device setting of MFP 100 as in the second embodiment, the third embodiment can be applied to the case where the print setting screen of the index printing is designated as in the first embodiment.

Figure 6A:
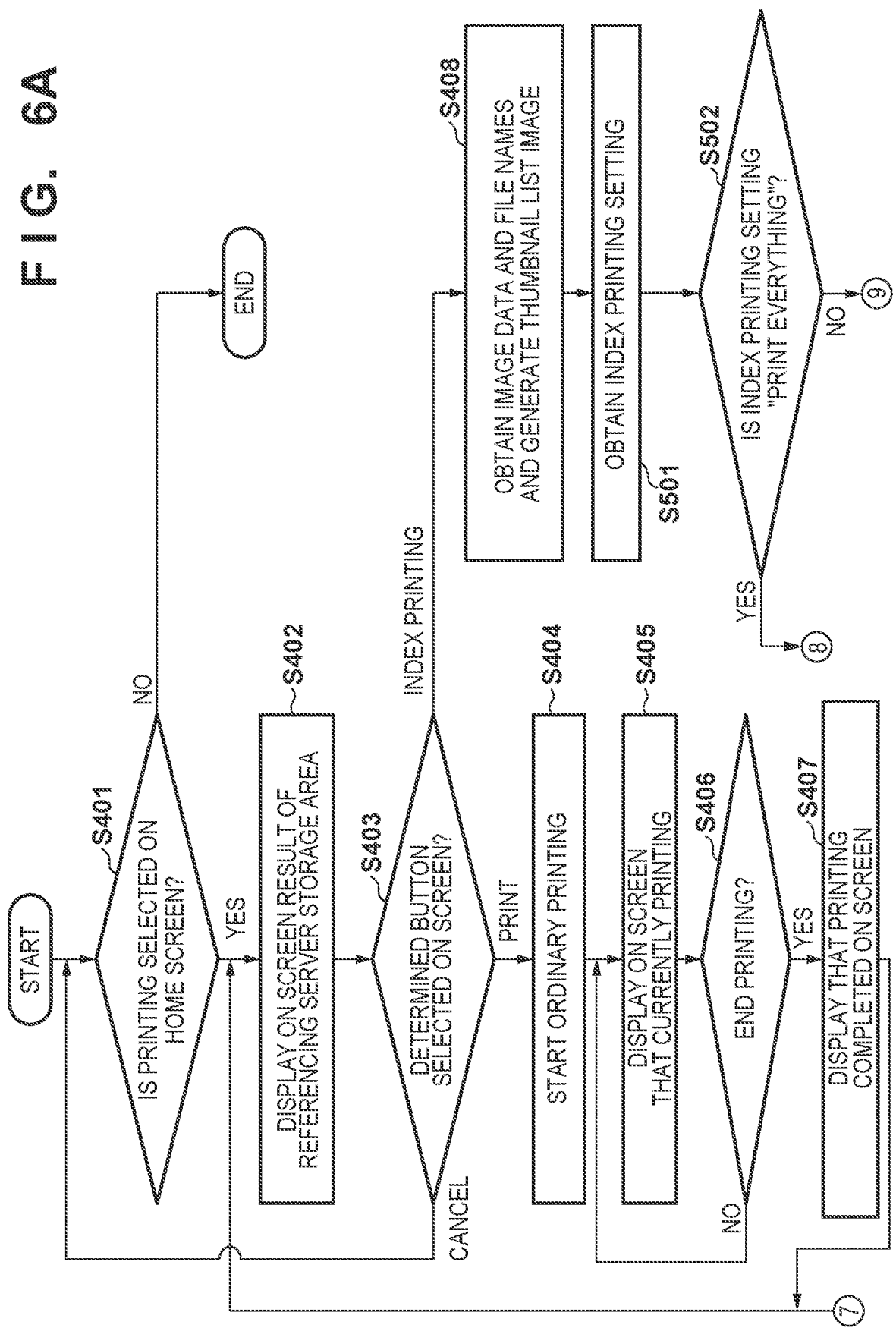

FIGS. 6A and 6B are flowcharts for describing index printing processing by the MFP 100 according to the third embodiment. The process shown in the flowchart is achieved by the CPU 211 executing the program deployed in the memory 213. In FIGS. 6A and 6B, the same reference numerals are assigned to processes common to those in the flowchart of FIGS. 4A and 4B and FIGS. 5A and 5B described above, and a description thereof is omitted.

In step S501, the CPU 211 obtains the print settings for index printing in the print settings of the MFP 100. Regarding the print settings obtained here, in addition to the setting of whether to print the total number of sheets or whether to allow the user to confirm whether to continue index printing each time a predetermined number of index sheets worth of printing is completed, the value of the specified number of index sheets when the latter is selected is also obtained. The procedure of the print setting of the index printing will be described later with reference to the flowchart of FIG. 18. In addition, since an initial value is set even if the print setting has not been made, processing is performed according to the initial value.

In step S601, the CPU 211 determines whether or not printing of the specified number of index sheets of the print setting obtained in step S501 has been completed, or whether or not printing of the entire job has been completed even though the specified number of index sheets has not been printed. If so, the processing proceeds to step S414; otherwise, the processing returns to step S412.

By this processing, in the case of selecting to allow the user to confirm whether or not to continue index printing every time a predetermined number of index sheets of printing is completed, the user can be allowed to confirm whether or not to continue index printing each time index printing of a specified number of index sheets is completed.

Note that, in step S416 of FIG. 6B, the screen is not the screen of FIG. 14A itself, and the button 1403 is switched to the display of "continue printing every predetermined number of sheets". Thus, in the third embodiment, when there is a selection to continue index printing, the index printing is interrupted for each index printing of a predetermined number of index sheets instead of in units of single-sheets as in the first embodiment, and the user confirms whether or not to continue the index printing.

FIG. 18 is a flowchart for describing a procedure for performing an index printing setting in device settings of the MFP 100 according to the third embodiment. The process shown in the flowchart is achieved by the CPU 211 executing the program deployed in the memory 213. In FIG. 18, the same reference numerals are assigned to processes common to those in the flowchart of FIG. 17 described above, and a description thereof is omitted.

In step S1801, the CPU 211 displays on the screen the fact that the current print setting of the index printing is for the print everything method, a button that switches to the method that allows the user to confirm the continuation of index printing for each predetermined number of sheets, and the field for setting the number of printed sheets. Note that the field for setting the number of printed sheets has an effect only when the user is allowed to confirm whether to continue index printing every predetermined number of index sheets, and an initial value is set when the user has not inputted in the setting field. Also, the button for switching to the print everything method is displayed in a grayed out state, and control is performed so that it cannot be selected because it is the current print setting.

FIG. 12C depicts a view showing an example of a screen for making the index printing setting which is included in the device settings of the MFP 100 according to the third embodiment.

Screen 1220 shows a screen for the index printing setting included in the device settings of the MFP 100. Title 1221 indicates that the screen 1220 is a screen for the index printing setting which is in the device settings of the MFP 100. Messages 1222 and 1223 and buttons 1224 and 1225 are the same as the messages 1212 and 1213 and the buttons 1214 and 1215 in the above-described FIG. 12B, and therefore their descriptions are omitted. Incidentally, in FIG. 12C, the display of the button 1225 is changed to "allow the user to confirm whether or not to continue printing every predetermined number of sheets".

Number of sheets setting field 1226 is a field for setting the number of sheets to be printed when the user is allowed to confirm whether or not index printing is to be continued for each predetermined number of sheets of the index printing setting. The field for setting for the number of printed sheets can be changed by inputting a numerical value or selecting an increment button or a decrement button for the numerical value in the setting field of the number of printed sheets. In FIG. 12C, since the present setting is the print everything setting, the button 1224 that specifies the print everything setting is displayed to be grayed out.

Then, the processing proceeds to step S1802 and the CPU 211 determines whether or not the button 1225, i.e., the method of allowing the user to confirm whether or not to continue index printing every predetermined number of sheets, has been selected, and if so, the processing proceeds to step S1803; otherwise, the process ends. In step S1803, the CPU 211 refers to the setting value of the setting field 1226 for the number of sheets to be printed in the method of allowing the user to confirm whether or not to continue index printing every predetermined number of sheets. Then the processing proceeds to step S1804, the CPU 211 updates the current print setting to the setting value for index printing so that the user is allowed to confirm whether to continue index printing each number of sheets obtained in step S1803, and this process ends. The index printing setting in the device settings of the MFP 100 obtained in step S501 of FIG. 6A corresponds to this setting value.

On the other hand, in step S1702, when the present print setting is not the print everything setting, the process proceeds to step S1805. In step S1805, the CPU 211 displays on the screen that the current index printing setting is for the method of allowing the user to confirm whether to continue printing a predetermined number of sheets at a time, the button 1225, and the button 1224 for switching to the print everything setting, and the field for setting the number of printed sheets 1226. Note that the field for setting the number of printed sheets 1226 has an effect only when switching to the method in which the user is allowed to confirm whether to continue index printing every predetermined number of sheets, and an initial value is set when the user has not inputted in the setting field. In addition, the button 1225 for switching to the method in which the user is allowed to confirm whether or not to continue printing each predetermined number of sheets is displayed to be grayed out state on this screen, and is controlled so as not to be selectable because it is the current printing setting. However, when the value of the number of sheets setting field 1226 is changed, the gray-out is canceled, and the selection of the button 1225 is accepted. Incidentally, the screen displayed at this time is a screen in which, in FIG. 12C, the button 1225 for switching to a method for allowing the user to confirm whether or not printing is to be continued every predetermined number of sheets is grayed out, and the graying out of the button 1224 for switching to the printing everything setting is cancelled.

Next, the processing proceeds to step S1806, the CPU 211 refers to the value set for the setting field 1226 for the number of sheets to be printed in the method of allowing the user to confirm whether or not to continue index printing every predetermined number of sheets. Next, the processing proceeds to step S1807, and the CPU 211 determines whether or not the setting of the number of printed sheets referred to in step S1806 has been changed from the number of printed sheets of the print setting of the present index printing. If it is determined that the change has been made, the process proceeds to step S1808, otherwise, the process proceeds to step S1810. In step S1808, CPU 211 cancels the grayout of the button 1225 for switching to the method of allowing the user to confirm whether or not to continue printing every predetermined number of sheets, and makes the selection possible. Then, the processing proceeds to step S1809 and the CPU 211 determines whether or not the button 1225 for allowing the user to confirm whether or not to continue printing every predetermined number of sheets is selected, and the processing proceeds to step S1810 when the button 1225 is not selected, and the processing proceeds to step S1803 when the button 1225 is selected. In step S1810, the CPU 2111 determines whether the print everything button 1224 has been selected on this screen, and if so, the processing proceeds to step S1811; otherwise this process is ended. In step S1811, the CPU 211 updates the setting indicating print everything from the current print settings of the index printing and terminates this process. The index printing setting in the device settings of the MFP 100 obtained in step S501 of FIG. 6A corresponds to this setting value.

As described above, by virtue of the third embodiment, in addition to the effect of the first embodiment, it is possible to select whether to print the total number of pages of the index consecutively or to interrupt index printing each time printing of a specified predetermined number of sheets is completed, and to allow the user to confirm whether or not to continue the index printing. Then, the printing process can be switched according to this selection. Thus, when the user determines that the printing result of the index printing includes an image to be ordinarily printed, the user can easily cancel the subsequent index printing. Thus, by interrupting the subsequent index printing, there is the effect that it is possible to eliminate unnecessary index printing.

Fourth Embodiment

Next, the fourth embodiment of the present invention will be described. It is assumed that the index printing in the fourth embodiment is set so that printing is interrupted each time one sheet of printing is completed, and the user can confirm whether or not to continue index printing. Then, at the time of that confirmation, options of whether or not to continue index printing, to cancel index printing, or to print all the remaining number of index sheets are displayed each time printing of one sheet is completed. The difference from the first embodiment is the options in the case of the setting to have the user confirm whether or not to continue index printing every time printing of one sheet is completed, and in the fourth embodiment, in addition to the two options of cancel or continue of the first embodiment, the option of completely printing the rest without interruption is added. The fourth embodiment can be applied not only to a configuration in which index printing is interrupted every time printing for one sheet is completed as in the first embodiment, but also to a configuration in which index printing is interrupted every time a predetermined number of sheets or more is completed as in the third embodiment. In addition to the configuration in which of the print method for the index printing is designated on a screen for selecting the printing method for the index printing as in the first embodiment, the fourth embodiment can be applied to the configuration in which the printing method for the index printing is in a device setting of the MFP 100 as in the second embodiment.

Figure 7A:
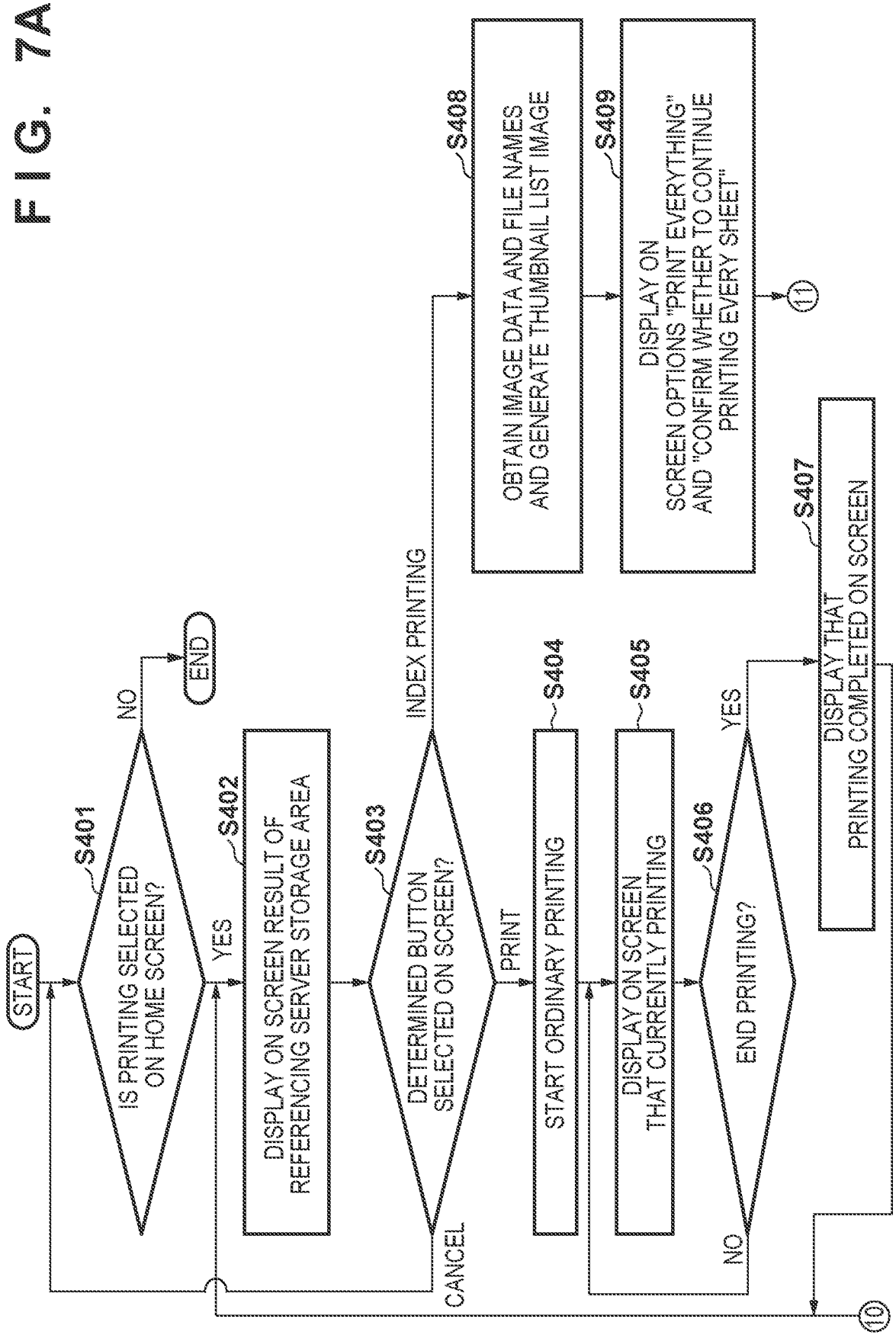
FIGS. 7A and 7B are flowcharts for describing index printing processing by an MFP according to a fourth embodiment.
Figure 7B:
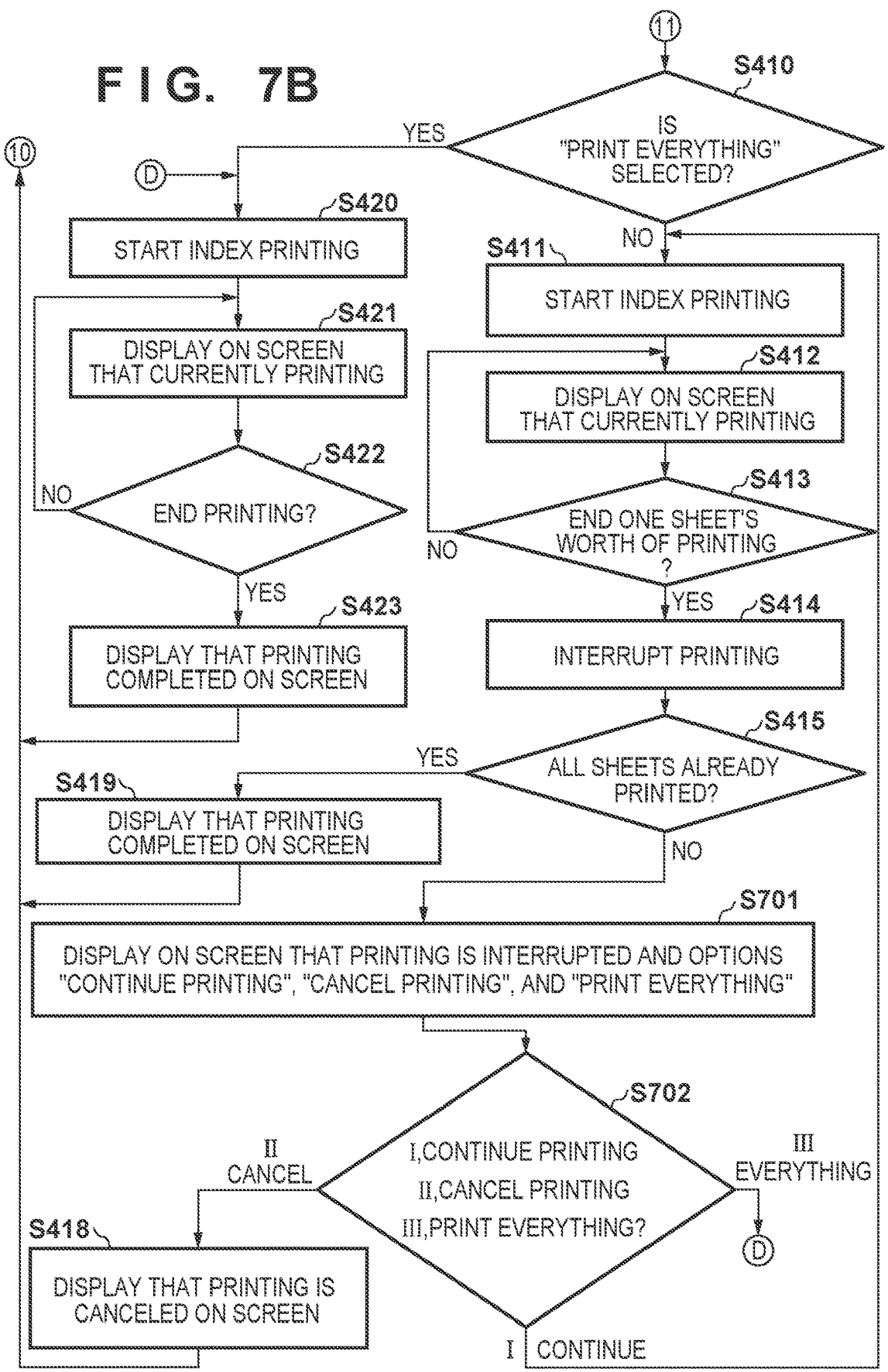

FIGS. 7A and 7B are flowcharts for describing index printing processing by the MFP 100 according to the fourth embodiment. The process shown in the flowchart is achieved by the CPU 211 executing the program deployed in the memory 213. In FIGS. 7A and 7B, the same reference numerals are assigned to processes common to those in the flowchart of FIGS. 4A and 4B described above, and a description thereof is omitted.

In step S701, the CPU 211 displays that printing is currently interrupted and displays three options on the screen: continuing index printing one sheet at a time, cancel index printing, or completely print the remaining number of sheets without interruption. This screen corresponds to FIG. 14B.

Figure 14B:
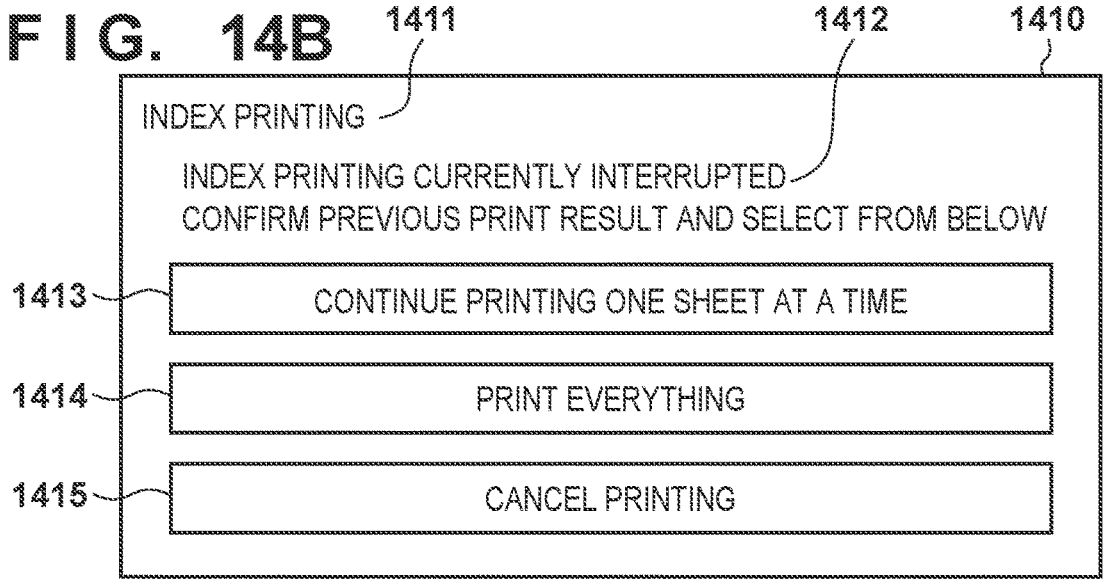
FIG. 14B depicts a view illustrating an example of a screen for displaying that index printing is being interrupted and displaying the three options of continuing printing, cancelling it, or printing all of the remaining number of sheets in the MFP according to the fourth embodiment.

FIG. 14B depicts a view illustrating an example of a screen, in the MFP 100 according to the fourth embodiment, for displaying that index printing is currently interrupted and displaying the three options of continue printing, cancelling printing, or completely printing the remaining number of sheets.

Screen 1410 indicates a screen for displaying that the index printing is currently interrupted and the displaying the options of continuing index printing, cancelling index printing, and completely printing the remaining number of sheets. Title 1411 indicates the index printing job status. Message 1412 and buttons 1413 and 1415 and message 1402 and buttons 1403 and 1404 of FIG. 14A are the same, and so description thereof will be omitted. The button 1414 is a button for instructing to completely print the remaining number of sheets in the index printing. When the button 1414 is selected, the method of completely printing the remaining number of sheets in the index printing is switched, and then the index printing is executed.

Next, the processing proceeds to step S702 and the CPU 211 determines which of the three buttons of the screen displayed in step S701 was pressed. When the button 1413 is selected and the continuation of printing one sheet at a time is instructed, the process proceeds to step S411. When the button 1415 is selected and it is an instruction to cancel index printing, the process proceeds to step S418. Also, if the button 1414 is selected to instruct to completely print the remaining number of sheets without interruption, the process proceeds to step S420.

In this process, when the user is allowed to confirm whether or not to continue printing each time one sheet of printing is completed in the index printing, the user can select whether to continue index printing each time one sheet of printing is completed, to cancel index printing, or to print all the remaining number of sheets.

As described above, according to the fourth embodiment, the following effects are achieved in addition to the effects of the first embodiment. When the user is allowed to confirm whether to continue index printing each time printing of one sheet's worth of index printing is completed, the user can select whether to continue index printing each time printing of one sheet is completed, to cancel index printing, or to completely print the remaining number of sheets. Thus, when the printing result of the index printing includes an image to be ordinarily printed, it is possible to easily cancel the subsequent index printing. Thus, there is the effect that it is possible to eliminate unnecessary index printing by interrupting the subsequent index printing.

Fifth Embodiment

Next, the fifth embodiment of the present invention will be described. It is assumed that when the index printing in the fifth embodiment is set so that the user is allowed to confirm whether or not to continue index printing each time one sheet of printing is completed, the following control is performed. That is, options as to whether to continue index printing, to cancel index printing, or to select a desired image from the previously printed index printing and print it ordinarily are displayed at the time of interruption. The difference to the first embodiment is the option to set to allow the user to confirm whether or not to continue index printing each time one sheet of printing is completed. In the fifth embodiment, an option for ordinarily printing an image selected from the previously printed index printing is added to the two options of cancelling and continuing of the first embodiment. The fifth embodiment can be applied not only to a configuration in which index printing is interrupted every time printing for one sheet is completed as in the first embodiment, but also to a configuration in which index printing is interrupted every predetermined number of sheets or more as in the third embodiment. In addition to the configuration in which of the print method for the index printing is designated by selecting the printing method for the index printing as in the first embodiment, the fifth embodiment can be applied to the configuration in which the printing method for the index printing is in a device setting of the MFP as in the second embodiment. Further, the fifth embodiment can be applied in a configuration in which, as in the fourth embodiment, three options of continuing index printing, cancelling index printing, and completely printing the remaining number of sheets are provided when the index printing is interrupted. Further, as a fourth option, an image selected from the index printing printed last time may be selected to be printed ordinarily.

In the fifth embodiment, when the user can find the desired image in the index printing on one printed index sheet, the desired image can be selected from the images included in the index printing rather than selecting the file name of the desired image from the file names included in the storage area of the server 101 again. When the amount of image data included in the storage area of the server 101 is large, it takes time and effort to find the file name of the desired image therein. Therefore, in the fifth embodiment, the user can easily find a desired image to be selected to be ordinary printed since the images are limited to only those included in a single sheet of the preceding index printing.

Figure 8A:
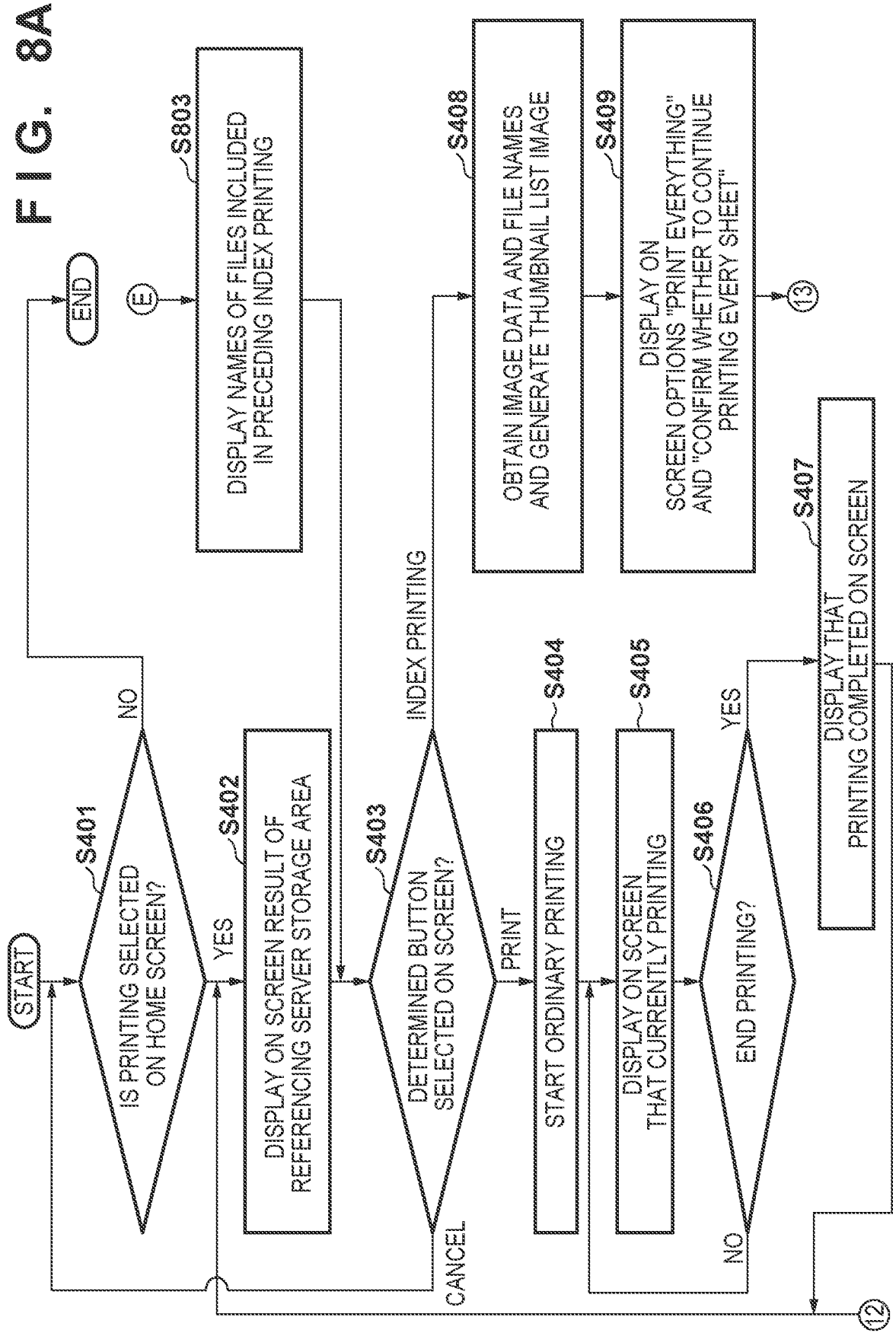
FIGS. 8A and 8B are flowcharts for describing index printing processing by an MFP according to a fifth embodiment.
Figure 8B:
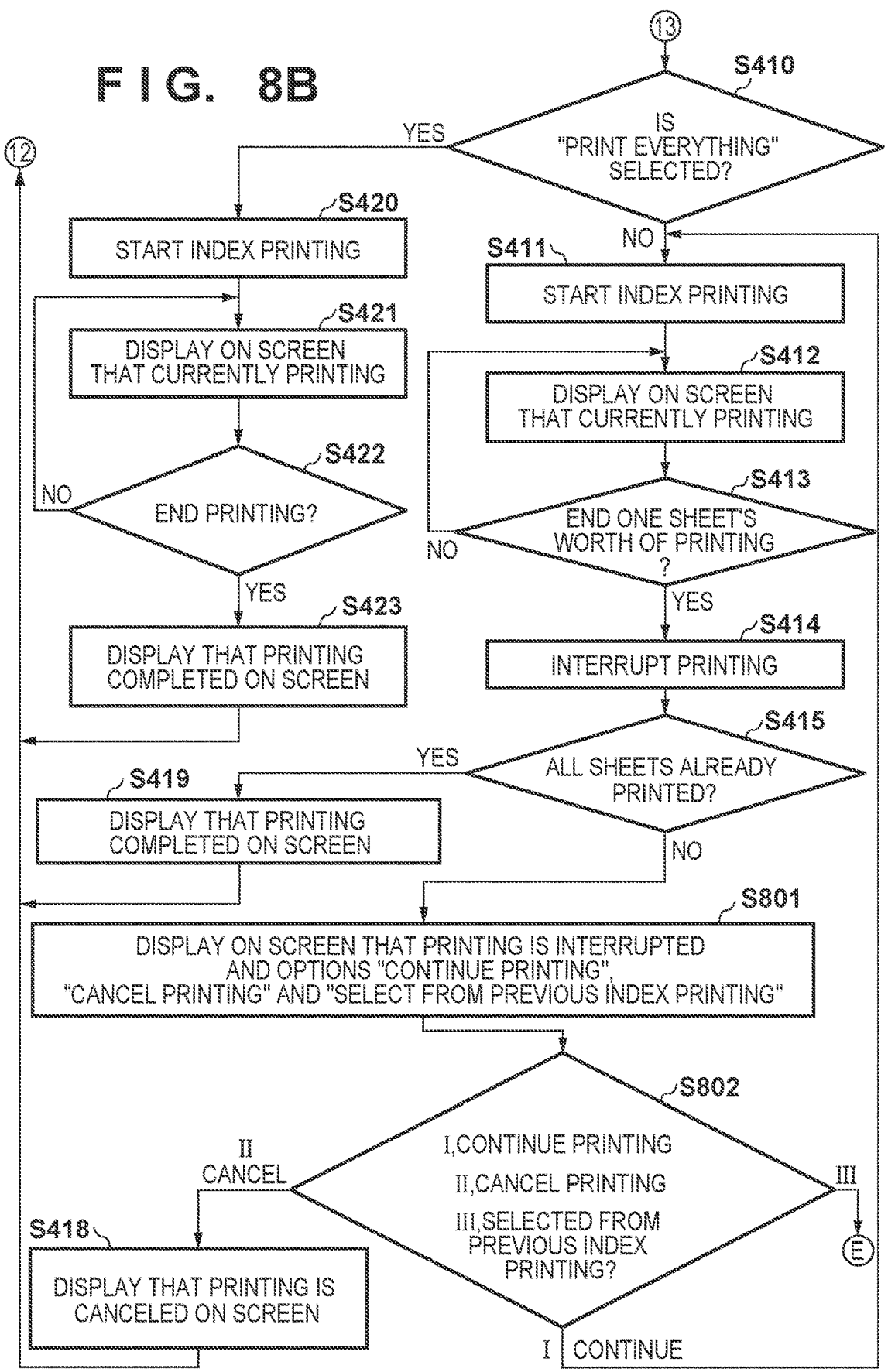

FIGS. 8A and 8B are flowcharts for describing index printing processing by the MFP 100 according to the fifth embodiment. The process shown in the flowchart is achieved by the CPU 211 executing a program deployed in the memory 213. In FIGS. 8A and 8B, the same reference numerals are assigned to processes common to those in the flowchart of FIGS. 4A and 4B described above, and a description thereof is omitted.

In step S801, the CPU 211 displays that index printing is currently interrupted and displays three options on the screen: continuing index printing one sheet at a time, cancel index printing, or ordinarily print an image selected from the preceding index printing. This screen corresponds to FIG. 14C.

Figure 14C:
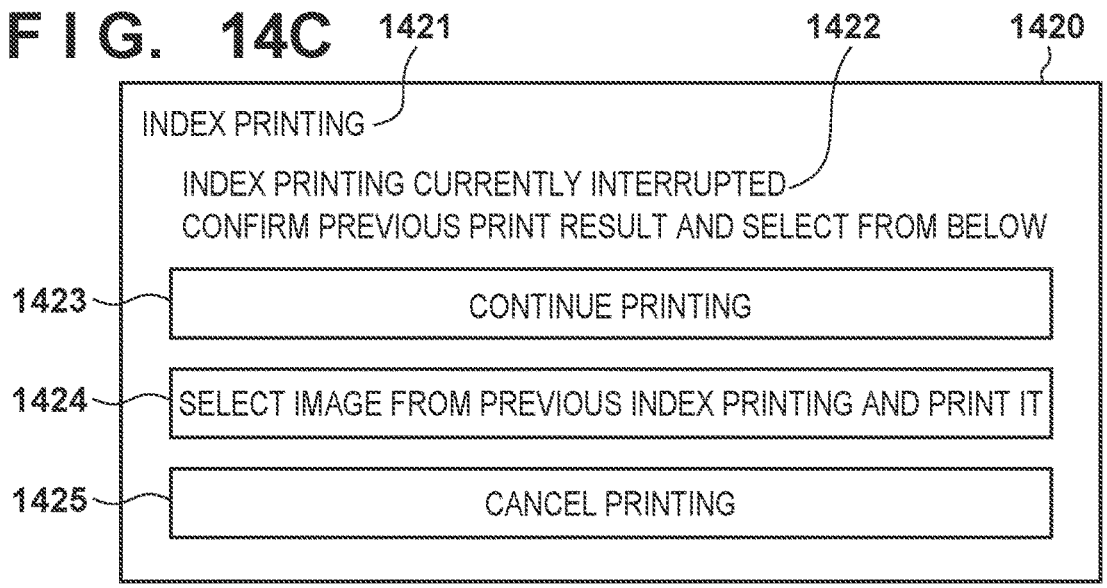
FIG. 14C depicts a view illustrating an example of a screen, in the MFP according to the fifth embodiment, for displaying that index printing is being interrupted and displaying three options of continuing printing, cancelling it, or selecting from a file of a previous time and performing ordinary printing.

FIG. 14C depicts a view illustrating an example of a screen in the MFP 100 according to the fifth embodiment for displaying that index printing is currently interrupted and displaying the three options of continuing index printing, cancelling index printing, or selecting an image from the previously printed index printing and performing ordinary printing.

Screen 1420 shows an example in which it is displayed that index printing is interrupted, and the options of continuing index printing, cancelling index printing, and selecting an image from the previously printed index printing and printing it ordinarily. Title 1421 indicates the index printing job status. Message 1422 and buttons 1423 and 1425 are the same as the message 1402 and buttons 1403 and 1404 of previously described FIG. 14A, and so description thereof will be omitted. Button 1424 is a button for instructing execution of the ordinary printing method by selecting an image from a previously printed index printing. When this button 1424 is selected, the process transitions to a screen for displaying the file name of the image of step S803 of FIG. 8A.

In step S802, the process branches into three patterns according to the option selected by the user for the three options of the screen displayed in step S801. When an instruction to continue index printing is made by the button 1423, the process returns to step S411. When the button 1425 is selected to instruct index printing to be cancelled, the process proceeds to step S418. Additionally, when the button 1424 is selected and an instruction was made to perform ordinary printing of an image selected from the previous index printing, the process proceeds to step S803. In step S803, the CPU 211 displays the file names included in the preceding index printing on the console unit 220. Here, the file name obtained in step S408 and each of the thumbnail list images included in the image data are stored in the memory 213 separately. When, in step S802, an instruction to print an image selected from the previous index printing is made, the image data of the file name is read from the memory 213, and otherwise it is deleted. Further, the screen for displaying the file names may be configured such that for the file names of the screen displayed in step S402 the results of referencing the storage area of the server 101 restricted to the file names of the previous index printing, or the file names stored in the memory 213 are read and displayed in a list.

For example, if the result of the previous index printing in step S803 is, for example, as shown in previously described FIG. 11, a screen displaying the file names of the 16 images shown in FIG. 11 and corresponding check boxes are displayed on the screen 1000 of FIG. 10. Then, the user selects a desired image to be printed ordinarily from the screen and presses the print button 1007. Then, the processing proceeds from step S403 to step S404 in FIG. 8A, and ordinary printing of the image selected by the user is performed.

By virtue of the fifth embodiment as described above, in addition to the effect of the first embodiment, the index printing is interrupted when the printing result of the index printing includes an image to be ordinarily printed. Then, the desired image can be selected from the previous index printing, and the selected image can be printed ordinarily.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-180838, filed Oct. 28, 2020, which is hereby incorporated by reference herein in its entirety.

What is claimed is:

1. An image forming apparatus, comprising:
a printer;
a display; and
a controller that causes the image forming apparatus to:
generate thumbnail images of predetermined pages which are a part of a plurality of pages of image data stored in an external storage medium and index information corresponding to the thumbnail images;
cause the printer to print onto a sheet the generated thumbnail images of the predetermined pages and the generated index information, and then cause the printer to stop printing based on performing printing of the generated thumbnail images of the predetermined pages and the index information onto the sheet;
select, in accordance with a user's instruction, whether to perform printing thumbnail images of pages of image data following the part of the plurality of pages of the image data or to select at least one page of image data to be printed based on the preceding printed thumbnail images of the predetermined pages;
cause, in a case where it is selected to perform the printing thumbnail images of pages of image data following the part of the plurality of pages of the image data, the printer to perform printing, onto another sheet which is different from the sheet, the thumbnail images of pages of image data following the part of the plurality of pages of the image data; and
cause, in a case where it is selected to select the at least one page of image data to be printed based on the preceding printed thumbnail images of the predetermined pages, the display to display file names of the preceding printed thumbnail images of the predetermined pages without displaying file names of other thumbnail images which are different from the preceding printed thumbnail images of the predetermined pages, and cause the printer to print the at least one page of image data selected by a user based on the displayed file names.

2. The image forming apparatus according to claim 1, wherein the controller is further configured to cause the image forming apparatus to:
select whether to print all of thumbnail images of the plurality of pages of the image data or to stop printing based on performing printing of the generated thumbnail images of the predetermined pages and the index information onto the sheet.

3. The image forming apparatus according to claim 1, wherein the controller is further configured to cause the image forming apparatus to:
select whether to print, onto the another sheet which is different from the one or more sheets, thumbnail images of the plurality of pages of the image data or to stop printing based on performing printing of the generated thumbnail images of the predetermined pages and the index information onto the sheet.

4. The image forming apparatus according to claim 1, wherein the controller is further configured to cause the image forming apparatus to:
when the printing is stopped, select a method for printing thumbnail images of pages of image data following the part of the plurality of pages of the image data.

5. The image forming apparatus according to claim 4, wherein the method for printing the thumbnail images of pages of image data following the part of the plurality of pages is selected from among a plurality of methods including a first method of stopping printing of thumbnail images of the predetermined pages after completion of printing thumbnail images onto a predetermined number of other sheets and a second method of printing all of the thumbnail images of pages of image data following the part of the plurality of pages of the image data.

6. The image forming apparatus according to claim 1, wherein the external storage medium is included in an information processing apparatus that is able to communicate with the image forming apparatus via a network.

7. The image forming apparatus according to claim 1, wherein the external storage medium is a storage medium connected to the image forming apparatus.

8. The image forming apparatus according to claim 1, wherein the controller is further configured to cause the image forming apparatus to:
allow the user to designate the index information; and cause the printer to print an image based on image data corresponding to the index information designated by the user without causing the printer to print an image based on image data not corresponding to the index information designated by the user.

9. A method of controlling an image forming apparatus, the method comprising:

generating thumbnail images of predetermined pages which are a part of a plurality of pages of image data stored in an external storage medium and index information corresponding to the thumbnail images;

causing a printer to print onto a sheet the generated thumbnail images of the predetermined pages and the generated index information, and then causing the printer to stop printing based on performing printing of the generated thumbnail images of the predetermined pages and the index information onto the sheet, selecting, in accordance with a user's instruction, whether to perform printing thumbnail images of pages of image data following the part of the plurality of pages of the image data or to select at least one page of image data to be printed based on the preceding printed thumbnail images of the predetermined pages;

causing, in a case where it is selected to perform the printing thumbnail images of pages of image data following the part of the plurality of pages of the image data, the printer to perform printing, onto another sheet which is different from the sheet, the thumbnail images of pages of image data following the part of the plurality of pages of the image data; and causing, in a case where it is selected to select the at least one page of image data to be printed based on the preceding printed thumbnail images of the predetermined pages, a display to display file names of the preceding printed thumbnail images of the predetermined pages without displaying file names of other thumbnail images which are different from the preceding printed thumbnail images of the predetermined pages, and causing the printer to print the at least one page of image data selected by a user based on the displayed file names.

10. A non-transitory computer readable-storage medium storing a program for causing an image forming apparatus to execute a method of controlling the image forming apparatus, the method comprising:

generating thumbnail images of predetermined pages which are a part of a plurality of pages of image data stored in an external storage medium and index information corresponding to the thumbnail images;

causing a printer to print onto a sheet the generated thumbnail images of the predetermined pages and the generated index information, and then causing the printer to stop printing based on performing printing of the generated thumbnail images of the predetermined pages and the index information onto the sheet, selecting, in accordance with a user's instruction, whether to perform printing thumbnail images of pages of image data following the part of the plurality of pages of the image data or to select at least one page of image data to be printed based on the preceding printed thumbnail images of the predetermined pages;

causing, in a case where it is selected to perform the printing thumbnail images of pages of image data following the part of the plurality of pages of the image data, the printer to perform printing, onto another sheet which is different from the sheet, the thumbnail images of pages of image data following the part of the plurality of pages of the image data; and causing, in a case where it is selected to select the at least one page of image data to be printed based on the preceding printed thumbnail images of the predetermined pages, a display to display file names of the preceding printed thumbnail images of the predetermined pages without displaying file names of other thumbnail images which are different from the preceding printed thumbnail images of the predetermined pages, and causing the printer to print the at least one page of image data selected by a user based on the displayed file names.

* * * * *